US012193463B2

(12) United States Patent
Wilson et al.

(10) Patent No.: US 12,193,463 B2
(45) Date of Patent: Jan. 14, 2025

(54) RETORT AGITATION SYSTEM AND METHOD

(71) Applicant: JOHN BEAN TECHNOLOGIES CORPORATION, Chicago, IL (US)

(72) Inventors: Frederick James Wilson, Fresno, CA (US); Kevin Andrew Carlson, Clovis, CA (US); Jacob Richardson, Clovis, CA (US)

(73) Assignee: John Bean Technologies Corporation, Chicago, IL (US)

( * ) Notice: Subject to any disclaimer, the term of this patent is extended or adjusted under 35 U.S.C. 154(b) by 174 days.

(21) Appl. No.: 18/056,995

(22) Filed: Nov. 18, 2022

(65) Prior Publication Data

US 2023/0084998 A1 Mar. 16, 2023

Related U.S. Application Data

(62) Division of application No. 16/459,498, filed on Jul. 1, 2019, now Pat. No. 11,533,935.

(51) Int. Cl.
*A23L 3/14* (2006.01)
*A23L 3/00* (2006.01)
*B01F 31/00* (2022.01)
*B01F 31/20* (2022.01)
*B01F 31/24* (2022.01)

(52) U.S. Cl.
CPC ............... *A23L 3/14* (2013.01); *A23L 3/001* (2013.01); *B01F 31/201* (2022.01); *B01F 31/24* (2022.01); *B01F 31/70* (2022.01); *A23V 2002/00* (2013.01)

(58) Field of Classification Search
CPC ..... A61L 2/04; A23L 3/10; A23L 3/14; A23L 3/001
See application file for complete search history.

(56) References Cited

U.S. PATENT DOCUMENTS

| 815,658 A | 3/1906 | Talbert |
| 881,120 A | 3/1908 | Guibbini |
| 1,975,073 A | 10/1934 | Chapman |
| 3,446,636 A | 5/1969 | Kraus |
| 4,170,421 A | 10/1979 | Balding et al. |
| 4,748,816 A | 6/1988 | Arfert et al. |
| 5,687,639 A | 11/1997 | Planck, Jr. et al. |
| 5,849,246 A | 12/1998 | Hashimoto et al. |
| 5,857,312 A | 1/1999 | Walden |

(Continued)

FOREIGN PATENT DOCUMENTS

| DE | 79 05 136 U1 | 5/1979 |
| JP | 2001-231521 A | 8/2001 |
| WO | 2005/082173 A2 | 9/2005 |

OTHER PUBLICATIONS

International Search Report and Written Opinion mailed Oct. 21, 2020, issued in corresponding International Application No. PCT/US2020/038351, filed Jun. 18, 2020, 13 pages.

*Primary Examiner* — Elizabeth Insler
(74) *Attorney, Agent, or Firm* — Christensen O'Connor Johnson Kindness PLLC

(57) ABSTRACT

A method of processing products in a retort having a length includes arranging products in at least one product carrier for movement along at least a portion of the length of the retort and reciprocating the at least one product carrier along at least a portion of the length of retort in a non-sinusoidal pattern of movement.

20 Claims, 26 Drawing Sheets

(56) References Cited

U.S. PATENT DOCUMENTS

| | | | |
|---|---|---|---|
| 6,009,800 A | 1/2000 | Planck, Jr. et al. | |
| 8,262,987 B2 | 9/2012 | Tago et al. | |
| 9,155,332 B2 | 10/2015 | LeBlanc et al. | |
| 2006/0130667 A1 | 6/2006 | Greve | |
| 2009/0311131 A1* | 12/2009 | Tago | A61L 2/04 422/1 |
| 2010/0155217 A1 | 6/2010 | Kruger et al. | |
| 2017/0143014 A1* | 5/2017 | Damhuis | A23L 3/02 |

* cited by examiner

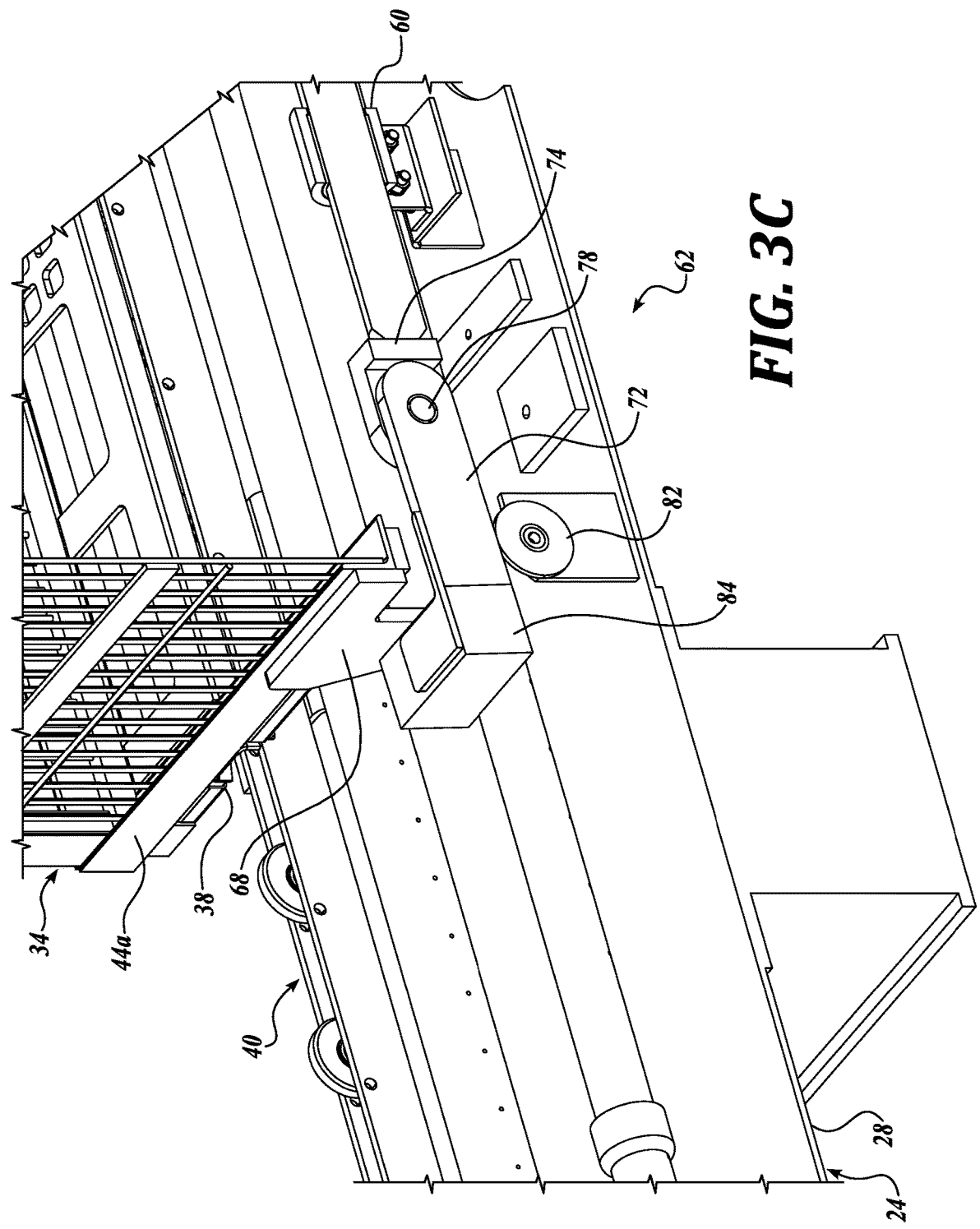

RETORT AGITATION SYSTEM AND METHOD

CROSS-REFERENCE TO RELATED APPLICATION

This application is a divisional of U.S. application Ser. No. 16/459,498, filed Jul. 1, 2019, the disclosure of which is incorporated by reference herein in its entirety.

FIELD OF THE INVENTION

The present invention relates to retort systems for in-container preservation of food products, and more particularly to a system and method for processing food products in a retort wherein the food products are agitated during thermal processing.

BACKGROUND

Retorts have been widely used for in-container preservation of food products for commercial pasteurization or sterilization processes. A retort generally includes a pressure vessel for receiving containers containing food products (hereinafter sometimes referred to as "in-container food products", "products", "containers", "foodstuffs", or the like) arranged in baskets or on trays that are stacked on pallets or other types of carrier structures. The commercial sterilization/pasteurization of the food products can occur by applying heating media to the in-container food products, including, for example, super-heated steam or hot water. Such heating media can be applied by spraying onto the stacked containers. Alternatively, the heating media can be introduced into the retort vessel to immerse the containers holding the food products.

Rather than utilizing a static system wherein the containers are held stationary within the retort vessel during pasteurization or sterilization, an agitating retort can be employed. Agitation of the food products during pasteurization/sterilization in a retort can result in a shorter processing time and improved quality and presentation (e.g., color) of the food product. Semi-convective products and those containing particulates especially benefit from agitation. The improvement in the presentation of the food product stems in part from a lower thermal load or burden having to be applied to the food product to accomplish the required level of pasteurization or sterilization.

The agitation of in-container food products in a retort has been accomplished by different systems. In one system the pallets/carriers of containers are loaded within a drum positioned within the retort vessel. The drum is rotated about its longitudinal axis to produce end-over-end agitation of the food product. Although end-over-end agitation is quite effective, it does require a drive system to rotate the drum as well as an extensive support structure for the drum during rotation within the retort, as well as systems for introducing the processing fluid into the rotating drum. Moreover, each in-container food product does not necessarily have the same G-force/motion profile. For example, the containers at the center of the basket will experience different motion than the products at the edges of the basket.

Another type of agitation retort relies on linear agitation of the in-container food product. By moving the food product back-and-forth over a relatively short distance within the retort, the change in direction at the end points of the back and forth travel results in deceleration and acceleration forces in the containers that induce an agitation effect on its content. The effect of linear agitation is less than that achievable by end-over-end agitation; however, in many cases such "light agitation" can sufficiently reduce the processing time and/or avoid clumping of the food product, to be warranted relative to simply static thermal processing of the food product. Moreover, linear agitation allows for a simpler design than end-over-end agitation.

A typical linear agitation system includes the drive mechanism consisting of a crankshaft rotated by a motor. Both the crankshaft and motor are located outside one end of the retort. A connecting rod system connects a crankshaft to the retort pallet/carrier. Relatively heavy duty drive systems are required in these types of linear agitation systems, including the need to counterbalance and smooth out the forces applied to the in-container food product by the rotating crankshaft. This counterbalancing is typically accomplished through the use of one or more flywheels. Although a crankshaft/flywheel system is simple and reliable, it has its limitations.

For instance, crankshaft/flywheel systems are limited to sinusoidal movement of the containers. In other words, the containers are limited to back and forth sinusoidal motion in the retort because the motion is coming from a rotating disc. As such, the G-force of the agitating baskets is directly limited by the stroke length (crank length) and the cycles/minute (rotary crank speed) of the agitation. In that regard, the agitation pattern is restricted to the same stroke length and movement pattern, regardless of the type of food product being agitated and/or the phase of sterilization/pasteurization.

A commercial sterilization/pasteurization process for a retort system may include three phases. During a first come-up phase, the retort vessel goes from a starting temperature, such as room temperature, to a second cook temperature for thermal processing the food products. A second cook/hold phase of the process involves holding the temperature of the vessel at the cook temperature. Finally, during a third cooling phase of the process, the vessel is cooled back down to normal temperatures.

During each phase of the process, the food product may change in consistency, texture, etc. For instance, certain food products can become soft as they are cooked. As such, it may be desirable to use a less aggressive agitation pattern during some or all of the cook/hold phase of the process to prevent deterioration of the food product. In another example, the food product may release starch as it is heated, resulting in a thickening of the food product. For such a product, it may be desirable to use a more aggressive agitation pattern during a later portion of the heating and/or cooling phases to help ensure a more even thermal processing of the food product.

Thus, it can be appreciated that a retort agitation system capable of being varied in stroke length, speed, acceleration, and G-force to create a custom agitation pattern for a specific food product would result in optimal thermal processing.

SUMMARY

In some aspects, the techniques described herein relate to a system for agitating products in a retort that includes a clamping assembly configured to selectively impose a first clamping force on a first end of at least one product carrier and a second opposing clamping force on a second end of the at least one product carrier, and a reciprocating assembly configured to apply linear forces on the product carriers for reciprocal movement of the product carriers along the retort.

In some aspects, the techniques described herein relate to a retort system that includes a processing vessel configured to receive at least one product carrier, a low friction support system for supporting the at least one product carrier for movement along the processing vessel, a clamping assembly configured to selectively impose a first clamping force on a first end of the at least one product carrier and a second opposing clamping force on a second end of the at least one product carrier, and a reciprocating assembly configured to apply linear forces on the at least one product carrier for reciprocal movement of the at least one product carrier along the processing vessel.

In some aspects, the techniques described herein relate to a method of processing products in a retort that includes arranging products in at least one product carrier for movement along the retort, imposing a first clamping force on a first end of the at least one product carrier and a second opposing clamping force on a second end of the at least one product carrier, and applying reciprocating forces to the at least one product carrier.

In some aspects, the techniques described herein relate to a method of processing products in a retort that includes arranging products in at least one product carrier for movement along a retort and reciprocating the at least one product carrier along the retort in a non-sinusoidal pattern of movement.

In some aspects, the techniques described herein relate to a method of processing products in a retort having a length, including: arranging products in at least one product carrier for movement along at least a portion of the length of the retort; and reciprocating the at least one product carrier along at least a portion of the length of retort in a non-sinusoidal pattern of movement.

In some aspects, the techniques described herein relate to a method of processing food products in a retort using a thermal process having at least one of a come-up phase for increasing a temperature of a food product, a cook/hold phase for substantially maintaining a temperature of a food product, and a cool phase for decreasing a temperature of a food product, the method of processing products in a retort including: arranging products in at least one product carrier for movement along at least a portion of a length of the retort; and executing, by a computing device, a first non-sinusoidal agitation profile for at least one of the come-up, cook/hold, and cool phases of the thermal process and a second non-sinusoidal agitation profile for at least one of the other come-up, cook/hold, and cool phases of the thermal process that is different in at least one of stroke length, pause duration between strokes, frequency, and acceleration of strokes than the first non-sinusoidal agitation profile, wherein a stroke is a movement of the at least one product carrier along at least a portion of the length of the retort.

In some aspects, the techniques described herein relate to a method of processing products in a retort having a length, including: arranging products in at least one product carrier for movement along at least a portion of the length of the retort; sending, by a computing device, one or more signals to a drive mechanism to execute a non-sinusoidal pattern of movement of the at least one product carrier by at least one of: a plurality of strokes of the at least one product carrier in a first direction before movement of the at least one product carrier back in an opposite second direction, wherein a stroke is a movement of the at least one product carrier by the drive mechanism along at least a portion of the length of the retort; a plurality of strokes of the at least one product carrier in a first direction before movement of the at least one product carrier back in an opposite second direction with a pause in movement between each of the plurality of strokes; a first acceleration of the at least one product carrier in a first direction and a second acceleration of the at least one product carrier lower than the first acceleration in a second opposite direction; a substantially constant acceleration over a first portion of the non-sinusoidal pattern of movement and moving the at least one product carrier with a substantially constant deceleration over a second portion of the non-sinusoidal pattern of movement; a substantially constant acceleration over a first portion of a stroke and moving the at least one product carrier with a substantially constant deceleration over a second portion of the stroke; moving the at least one product carrier in a first direction before moving the at least one product carrier back in an opposite second direction with a pause in movement of the at least one product carrier between the first and second directions, wherein a pause in movement is a stop in the movement of the at least one product carrier that is more than an interruption in movement that occurs when the at least one carrier reverses direction; a first agitation motion profile for a first phase of a thermal process and a second agitation motion profile for a second phase of the thermal process; and varying a stroke length and a speed for a plurality of cycles while keeping frequency constant for each of the plurality of cycles, wherein a cycle is movement of the at least one product carrier in a first direction from a start position along at least a portion of the length of retort and movement of the at least one product carrier in a second opposite direction back to the start position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 3C is an isometric view of a first clamping subassembly of the retort having a retort agitation system shown in FIG. 3A;

DETAILED DESCRIPTION

Figure 1:
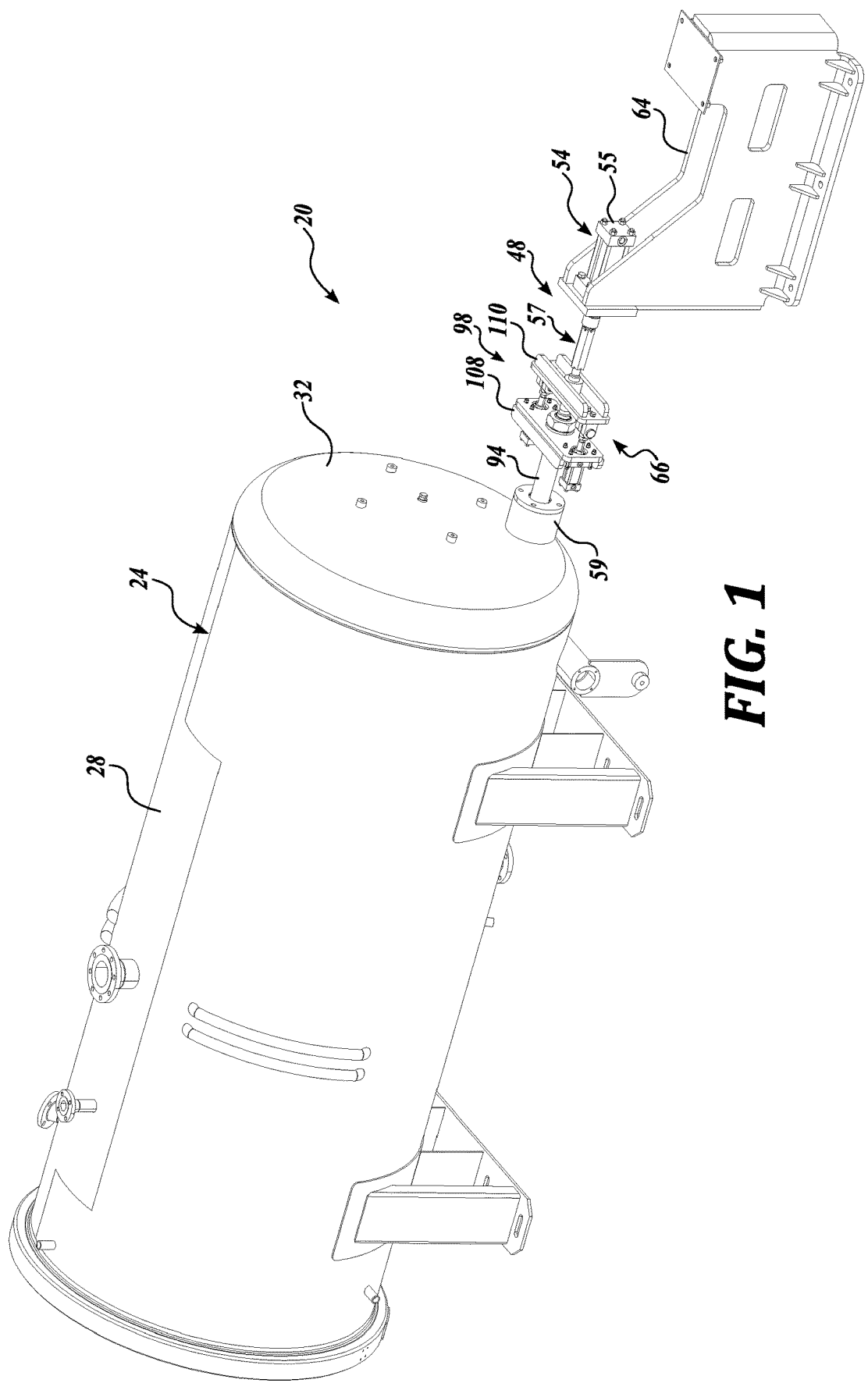
FIG. 1 is an isometric view of a retort having a retort agitation system formed in accordance with an exemplary embodiment of the present disclosure.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "distal," "proximal" "upward," "downward," "in," "out," "extended," "advanced," and "retracted." These references and other similar or corresponding references in the present application are only to assist in helping describe and understand the present disclosure and are not intended to limit the present disclosure to these directions.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

The following description and illustrations provided herein are directed to a retort agitation system and method for in-container commercial sterilization of food products that is capable of being varied in at least stroke length, speed, acceleration, and G-force to create a custom agitation pattern for the food product. Although the retort agitation system and method is described as being useful for food products contained in pouches, the retort agitation system and method may also be useful for preserved foods in other types of containers, such as cartons, cans, bottles, tubs, trays, etc. Accordingly, the descriptions and illustrations provided herein should not be seen as limiting.

The retort agitation system and method will now be described in detail. In particular, a system for agitating in-container food products during a commercial sterilization/pasteurization process will first be described.

FIGS. 1-4 illustrates an exemplary embodiment of a retort agitation system 20 for use with a thermal processing vessel 24 having a vessel body 28 enclosed by a dished head 32 at a back end and a vessel door (not shown for clarity) at a front end. It will be appreciated that FIGS. 1-4 do not show all the details of a typical retort, such as the detailed aspects of the system for introducing the heating medium into the retort or for removing and/or recirculating the heating medium. These aspects of retort vessels are known to those familiar with retort design and technology. Different heating media and delivery systems can be utilized, including spraying superheated water onto the product containers or filling the interior of the retort with hot water or saturated steam, for example.

Figure 5:
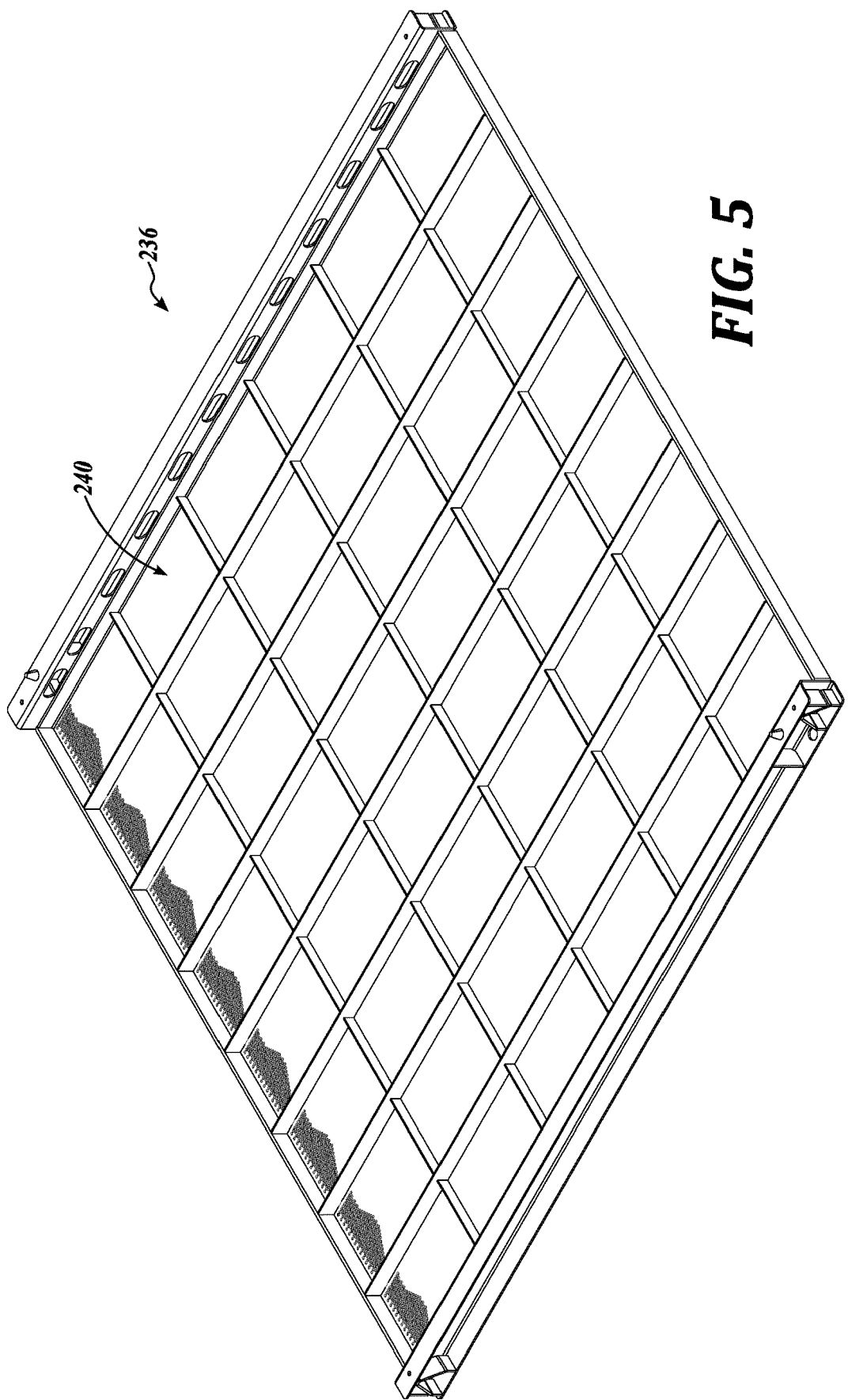
FIG. 5 is an exemplary embodiment of a carrier for use in the retort having a retort agitation system shown in FIGS. 1-4.

The vessel 24 is configured to receive a load defined by one or more product carriers, such as front and rear baskets 36*a* and 36*b* (hereinafter sometimes generally called "baskets 36") configured to hold in-container food products (not shown) in a manner well known in the art. In one exemplary embodiment, the baskets 36 are configured to hold a plurality of pouches containing a food product (not shown). In another embodiment, as shown in FIG. 5, the product carriers are defined by one or more trays 236 stacked on a pallet (not shown) in a manner well known in the art. When using a tray 236, the in-container food products are loaded (either manually or automatically) into pockets 240 of the tray 236 for thermal processing. The load may instead be defined by any other suitable product carrier(s) configured for holding a plurality of in-container food products, such as pouches, cans, bottles, tubs, trays, etc.

The baskets 36 are loadable onto a low friction support system in the vessel 24 either manually or with a loading device such as a shuttle, a chain conveyor drive, etc. The low friction support system is configured to support the baskets 36 as they are loaded into the vessel 24 and as they are agitated for low friction movement along the interior of the vessel. This can be accomplished by different means. In the depicted embodiment, the low friction support system is defined by two or more roller assemblies 40 extending along a length of the vessel 24 in a bottom section of the vessel 24 (only one roller assembly shown in the cross-sectional views). The roller assemblies 40 bear against the underside of the baskets 36 in a known manner. For instance, the roller assemblies 40 may be defined by rollers aligned in a track that are receivable within correspondingly shaped grooves 38 defined on a bottom base portion 44*a* and 44*b*, respectively, of the front and rear baskets 36*a* and 36*b* (sometimes referred to as the "base portion 44 of the baskets 36" or the like).

In an alternative embodiment, rollers can be axled to the underside of baskets 36. In such an embodiment, appropriate bearings can be interposed between the rollers and their axles to minimize the rotational friction on the rollers. As yet another alternative, balls in the form of ball bearings can be used in place of rollers. The ball bearings can be mounted in the floor structure of the vessel 24 or to the base portion 44 of the baskets 36. It should be appreciated that the low friction support system may instead be defined with any other suitable structure suitable.

With the baskets 36 loaded onto the roller assemblies 40 in the vessel 24, the baskets may be reciprocated linearly (hereinafter sometimes described as "agitated" or the like) along the length of the vessel 24 by the retort agitation system 20. The retort agitation system 20 is generally configured to agitate the baskets 36 in a non-sinusoidal and/or customizable pattern optionally through direct coupling of the agitation system to the baskets 36. In that regard, the retort agitation system 20 generally includes a reciprocating assembly 48 configured to agitate the baskets 36 with variable input to create a non-sinusoidal and/or customizable pattern, and a clamping assembly 50 configured to directly secure the baskets 36 to the reciprocating assembly for agitation.

The reciprocating assembly 48 will first be described in detail. The reciprocating assembly 48 is configured to linearly move the baskets 36 back and forth along a length of the vessel 24 with variable input such that the agitation is not limited to a sinusoidal pattern of movement. In the depicted embodiment, the reciprocating assembly 48 includes a variable input drive mechanism 54 suitable for driving a reciprocating member or rod 58 back and forth along a length of the vessel 24.

One or more rod supports 60 may extend from a bottom portion of the vessel 24 for supporting the reciprocating rod 58 as it is moved back and forth in the vessel 24. The rod support(s) 60 may be any suitable low friction device configured to maintain the axial alignment of the reciprocating rod 58 with the drive mechanism 54 while allowing the reciprocating rod 58 to move back and forth without substantial restriction. For instance, the rod support(s) 60 may be defined by a bushing secured to a bracket or other mounting assembly. Any other suitable support assembly may instead be used.

A suitable anti-rotation feature(s) may be used to substantially prevent the reciprocating rod 58 from rotating about its longitudinal axis. For instance, a keyed slot may be defined along a length of the reciprocating rod 58 that receives a key extending from a suitable structure that interfaces with the reciprocating rod 58. In that regard, the rod support(s) 60 may include a key configured to interface with a keyed slot on the reciprocating rod 58, or the anti-rotation feature may instead be defined on other components as described below.

The variable input drive mechanism 54 is capable of moving the rod 58 in a forward and backward direction by reversing the drive direction, as opposed to a prior art flywheel system that only rotates in one direction. The drive mechanism 54 may be any variable input drive mechanism suitable for driving the reciprocating rod 58 linearly back and forth along a length of the vessel 24 in a customized (non-sinusoidal) agitating pattern. In the depicted embodiment, the drive mechanism 54 is a hydraulic linear actuator having a cylinder 55 with a piston rod 56 coupled to and in axial alignment with the reciprocating rod 58. The piston rod 56 may be coupled at its distal end to the rear end of the reciprocating rod 58 in any suitable manner, such as with a coupling assembly 57. It should be appreciated that other drive mechanisms may instead be used, such as an electric linear actuator, a servo motor, first and second pneumatically controlled air bags configured to engage the front and rear baskets 36*a* and 36*b*, respectively, a pneumatic/hydraulic piston, or any other mechanical actuator that is configured to impart a linear force through a linear stroke.

The drive mechanism 54 includes suitable electrical and/or mechanical components configured to independently vary the stroke length of the reciprocating rod 58, pause/stop the reciprocating rod 58 between stroke actuations/motions, vary the G-force of the reciprocating rod 58, etc., to create a customized non-sinusoidal agitating pattern. For instance, if the drive mechanism 54 is configured as a hydraulic cylinder, it may include suitable valves and controls for driving the rod 58 in a specific pattern and/or with a specific acceleration, speed, etc. In this manner, the reciprocating rod 58 (and therefore the baskets 36) can be moved in a variety of different agitating patterns specific to the agitation needs of the food product in the containers. For instance, the drive mechanism 54 is configured to move the reciprocating rod 58 in at least the agitating patterns shown and described with respect to FIGS. 7-15.

In one aspect, the drive mechanism 54 may include a position sensor or feedback device for monitoring the linear position of the piston rod 56 (and therefore the reciprocating rod 58) during the thermal process. For instance, a linear encoder may be used to sense the linear position of the piston rod 56 and to output one or more signals indicative of the rod position to an integrated or separate (wired or wireless) controller (not shown). The controller may be configured to, in response to the one or more encoder signals, output one or more signals to the drive mechanism 54 for activating and controlling the speed, acceleration, direction, etc., of the reciprocating rod 58 (such as by controlling a proportional valve of the hydraulic cylinder to follow a pre-programed agitation motion profile). The controller may be any suitable electronic client device, such as a computer, personal digital assistant, cell phone, tablet computer, or any other suitable device in which computer software or other digital content may be executed. The electronic client device can be controlled either directly or by a remote connection using industry standard communication protocols such as HART, Modbus, 4-20 mA, and H1, as well as other protocols.

The drive mechanism 54 may be mounted to a support structure 64 that is external to the vessel 24. In this manner, the drive mechanism 54 need not be configured to withstand the internal extreme temperature variations of the vessel 24. Moreover, by being located outside the vessel 24 on a separate structure, the vessel 24 will not be susceptible to the main reciprocating forces of the drive mechanism 54. In that regard, the support structure 64 is any suitable structure configured to locate the reciprocating rod 58 along a desired reciprocating axis for engaging and agitating the baskets 36 and for withstanding the main reciprocating forces of the drive mechanism 54. However, it should be appreciated that the drive mechanism 54 and support structure 64 may instead be configured to be located inside the vessel 24.

With the drive mechanism 54 located outside the vessel 24, however, the reciprocating rod 58 can pass through the dished head 32 of the vessel 24 via a suitable rod sealing/bushing member 59 having a central bore (not labeled). A suitable sealing interface (such as with an O-ring, etc.) may be defined between an exterior surface of the rod sealing/bushing member 59 and the dished head 32 of the vessel 24 and between an interior surface of the rod sealing/bushing member 59 and the reciprocating rod 58.

The clamping assembly 50 configured to directly secure the baskets 36 to the reciprocating assembly 48 for agitation will now be described in detail. The clamping assembly 50 includes a first clamping subassembly 62 defined at a front end of the reciprocating rod 58 and a second clamping subassembly 66 defined at a back end of the reciprocating rod 58 for engaging and imposing opposing clamping forces on the front and rear baskets 36a and 36b, respectively. In that regard, the first and second clamping subassemblies 62 and 66 also secure the baskets 36a and 36b together.

Referring to FIGS. 2A-2C, 3A-3C, and 4A-4B, the first clamping subassembly 62 is generally configured to selectively engage and impose a clamping force on the front basket 36a. More specifically, the first clamping subassembly 62 is moveable between a first position, where the first clamping subassembly 62 is disengaged from the front basket 36a and the baskets 36 are free to be loaded/unloaded from the retort (see FIGS. 2A-2C), and a second position, where the first clamping subassembly 62 is positioned to engage and impose a clamping force on the front basket 36a (see FIGS. 3A-3C and 4A-4B). The first clamping subassembly 62 is moveable between the first and second positions by extending and retracting the reciprocating rod 58, respectively. The first clamping subassembly 62 may be any suitable configuration for selecting engaging and imposing a clamping force on the front basket 36a.

In the depicted embodiment, the first clamping subassembly 62 is generally configured as a tailgate mechanism configured to selectively engage and impose a clamping force on the front basket 36a. More specifically, the first clamping subassembly 62 includes a pivot arm 72 pivotally secured to a front end of the reciprocating rod 58 through a bracket 74 or other suitable structure. A first pivot pin 78 extends transversely through a first end of the pivot arm 72 and through the bracket 74 to define a first pivot axis that is transverse to the longitudinal axis of the reciprocating rod 58. The pivot arm 72 is moveable along and pivotal about a pivot roller 82 secured in a bottom of the vessel 24. As the reciprocating rod is extended and retracted toward the front and back of the vessel 24, the pivot arm 72 rolls along and pivots about the pivot roller 82 between a lowered and raised or first and second position.

More specifically, the pivot arm 72 is moveable about the first pivot axis between at least the first position, where the pivot arm 72 is pivoted downwardly and out of axial alignment with the reciprocating rod 58 (see FIGS. 2A-2C), and the second position, where the pivot arm 72 is in axial alignment with the reciprocating rod 58 (see FIGS. 3A-3C and 4A-4B). The pivot arm 72 is moveable into the first position by moving the reciprocating rod 58 forward with the drive mechanism 54 until the pivot axis of the first pivot pin 78 is substantially aligned with the pivot axis of the pivot arm roller 82. With this substantial alignment, the pivot arm roller 82 is no longer providing support beneath the pivot arm 72 so the pivot arm 72 can pivot downwardly about the pivot axis of the first pivot pin 78.

The pivot arm 72 is moveable into the second position by retracting the reciprocating rod 58 with the drive mechanism 54. As the reciprocating rod 58 is retracted, the outer surface of the roller 82 urges the pivot arm 72 upwardly until it is aligned with the axis of the reciprocating rod 58. A first carrier or basket stop 84 extends transversely from the front end of the pivot arm 72 and is positioned to engage the front basket 36a when the pivot arm 72 is moved upwardly into the second position. In the depicted embodiment, the basket stop 84 is positioned to engage a clamp engagement plate 68 defined on a bottom base portion 44a on the front end of the front basket 36a.

The clamp engagement plate 68 extends downwardly from the bottom base portion 44a of the front basket 36a such that the first basket stop 84 can be moved in front of the clamp engagement plate 68 as it is moved into the second position. In this second position, the reciprocating rod 58 may be retracted toward the back of the vessel 24 until the first basket stop 84 imposes a clamping force on the front of the clamp engagement plate 68. The anti-rotation feature(s) described herein ensure alignment of the first basket stop 84 with the clamp engagement plate 68 as it is moved into the second position. An opposing clamping force is imposed on the rear basket 36b by the second clamping subassembly 66 after the reciprocating rod 58 is moved into the retracted position. The second clamping subassembly 66 may be any suitable configuration that is generally configured to selectively engage and impose a clamping force on the rear basket 36b with the reciprocating rod 58 in the retracted position.

Figure 3A:
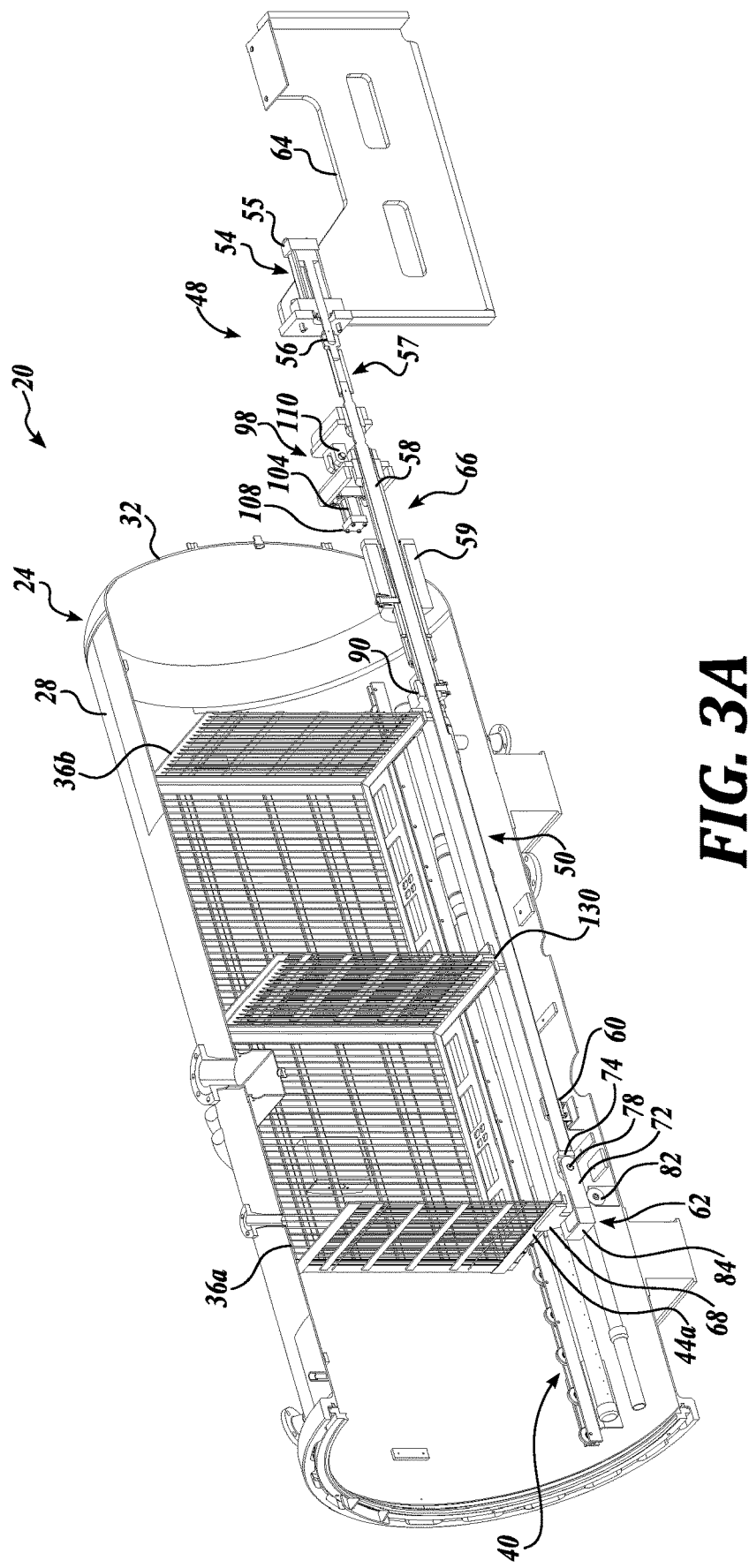
FIG. 3A is an isometric cross-sectional view of the retort having a retort agitation system shown in FIG. 1, wherein the retort agitation system is shown in a second, loaded position.
Figure 3B:
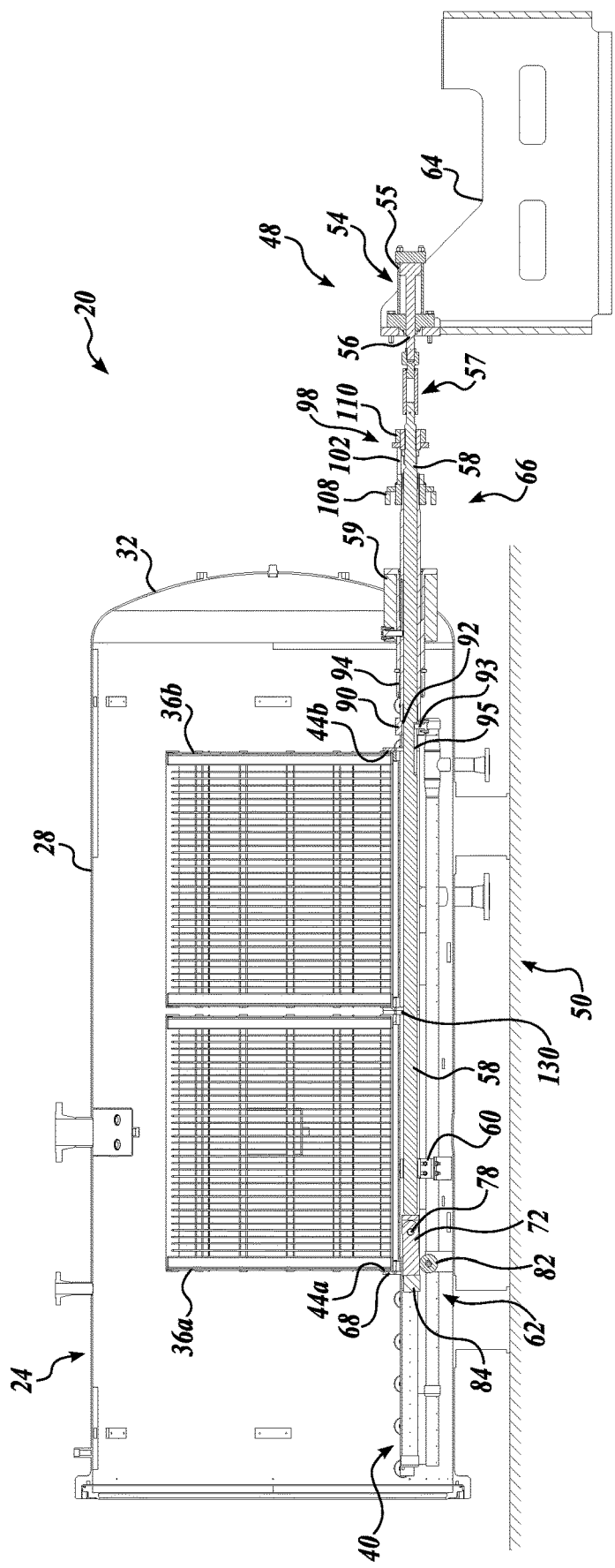
FIG. 3B is a side view of the retort having a retort agitation system shown in FIG. 3A.
Figure 3D:
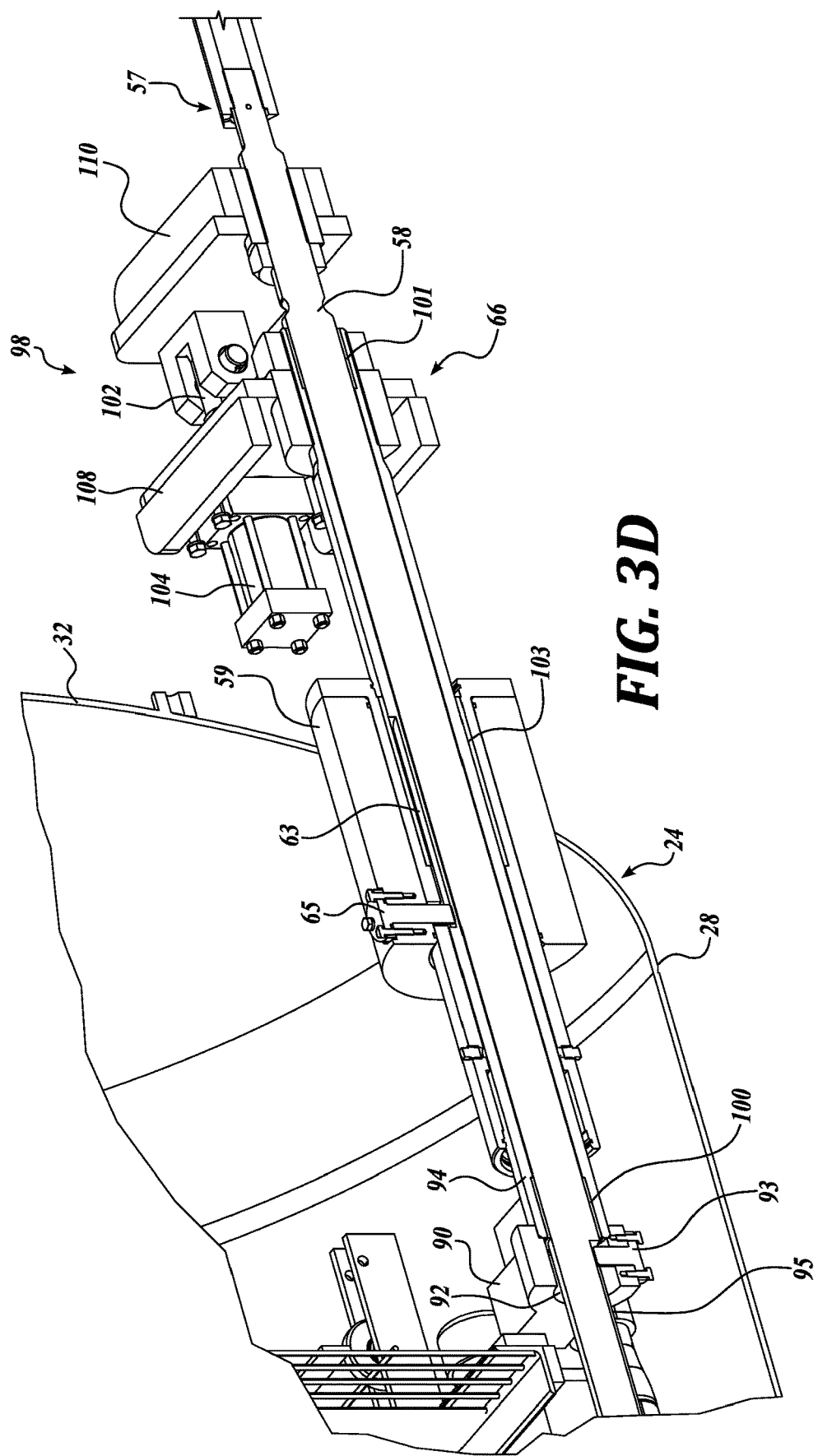
FIG. 3D is an isometric view of a second clamping subassembly of the retort having a retort agitation system shown in FIG. 3A.
Figure 4A:
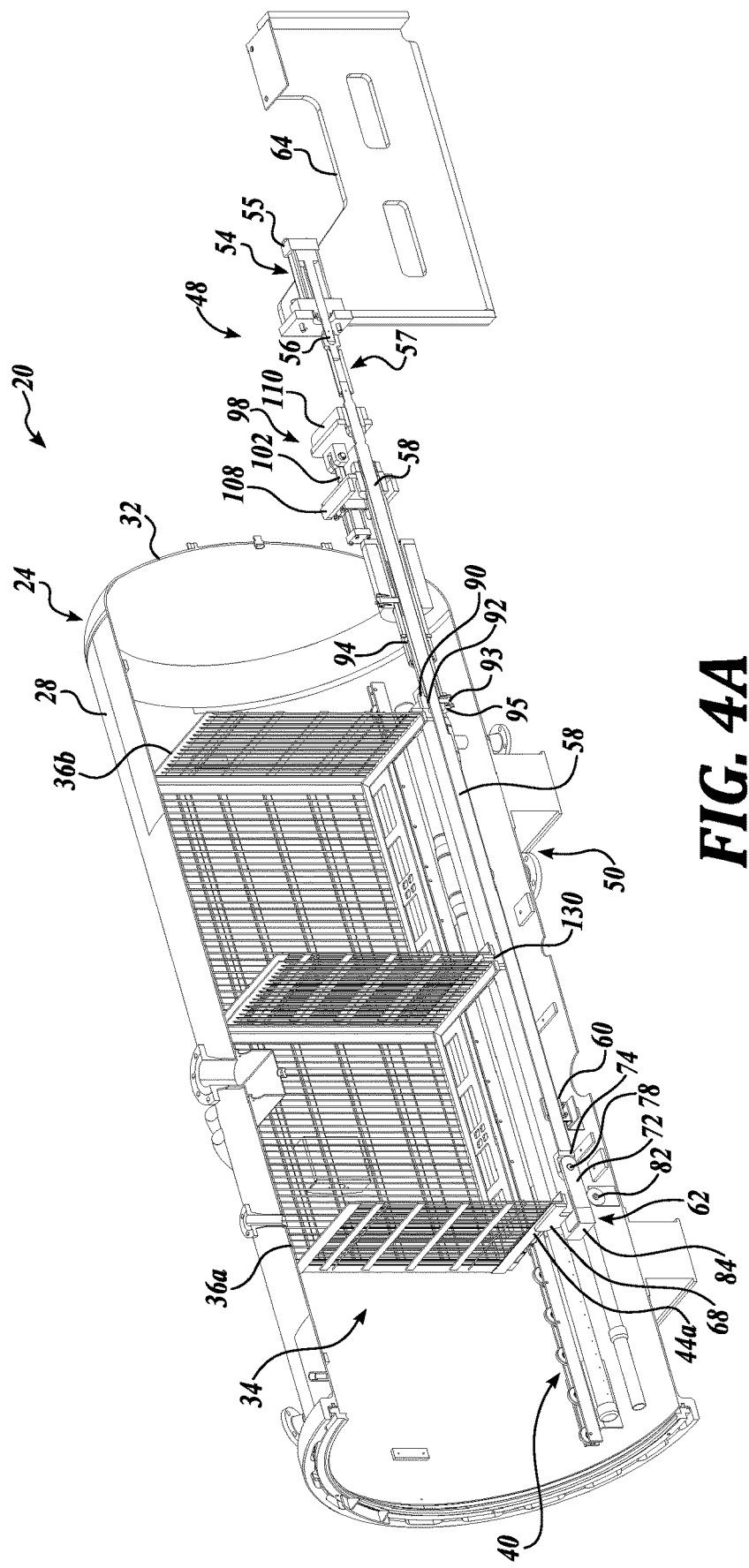
FIG. 4A is an isometric cross-sectional view of the retort having a retort agitation system shown in FIG. 1, wherein the retort agitation system is shown in a third, clamped position.
Figure 4B:
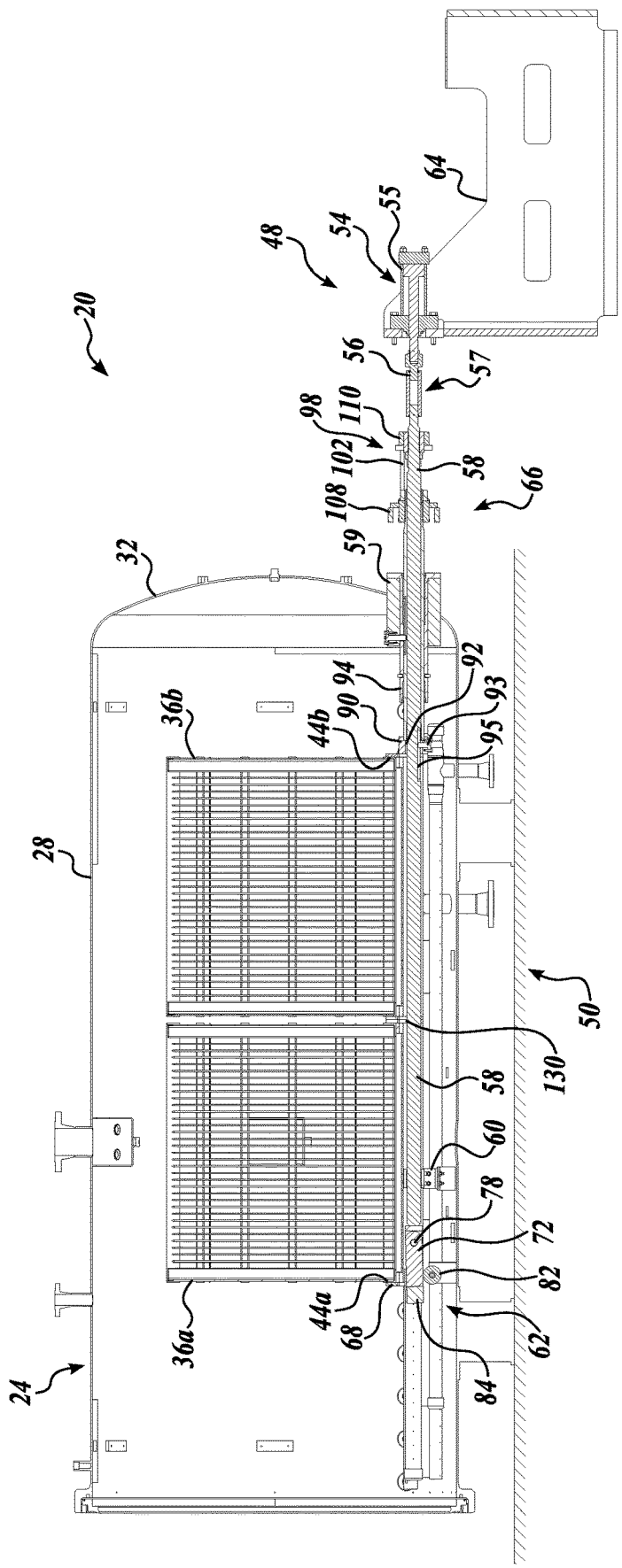
FIG. 4B is a side view of the retort having a retort agitation system shown in FIG. 4A.

In the depicted embodiment, the second clamping subassembly 66 includes a second carrier or basket stop 90 that is moveable along the reciprocating rod 58 between a first position, where the second basket stop 90 is disengaged from the rear basket 36b (see FIGS. 3A, 3B, and 3D), and a second position, where the second basket stop 90 is engaged with and imposes a clamping force on the rear basket 36b (see FIGS. 4A-4B). The second basket stop 90 is a suitable configuration to be moveably coupled to the reciprocating rod 58 and to be engaged with the rear basket 36b. For instance, the second basket stop 90 may be substantially cylindrically shaped having a central bore 92 for receiving the reciprocating rod 58.

The second basket stop 90 is defined on a distal end of a clamping rod 94 configured to be moved toward and away from the rear basket 36b. The clamping rod 94 can be moved linearly toward the rear basket 36b until the second basket stop 90 imposes a clamping force on the bottom portion 44b of the rear basket 36b, and it can be moved linearly away from the rear basket 36b to release the clamping force. In the depicted embodiment, the clamping rod 94 is concentrically located on the reciprocating rod 58 such that it moves along the same axis as the reciprocating rod 58 (and in this regard, the clamping rod 94 is essentially a tube). In that regard, the clamping rod 94 includes a central bore 96 for receiving the reciprocating rod 58, and bushings 100 and 101 or another low friction interface, such as bearings, lubrication, etc., (are disposed between the clamping rod 94 and the reciprocating rod 58 such that the clamping rod 94 may slide easily along the reciprocating rod 58. The clamping rod 94 also extends along a length of the reciprocating rod 58 such that it extends into and out of the vessel 24 through the rod sealing/bushing member 59. In that regard, a bushing 103 or other suitable low-friction interface may also be disposed between the rod sealing/bushing member 59 the clamping rod 94 to allow the clamping rod 94 (and reciprocating rod 58) to easily slide therethrough.

Figure 2A:
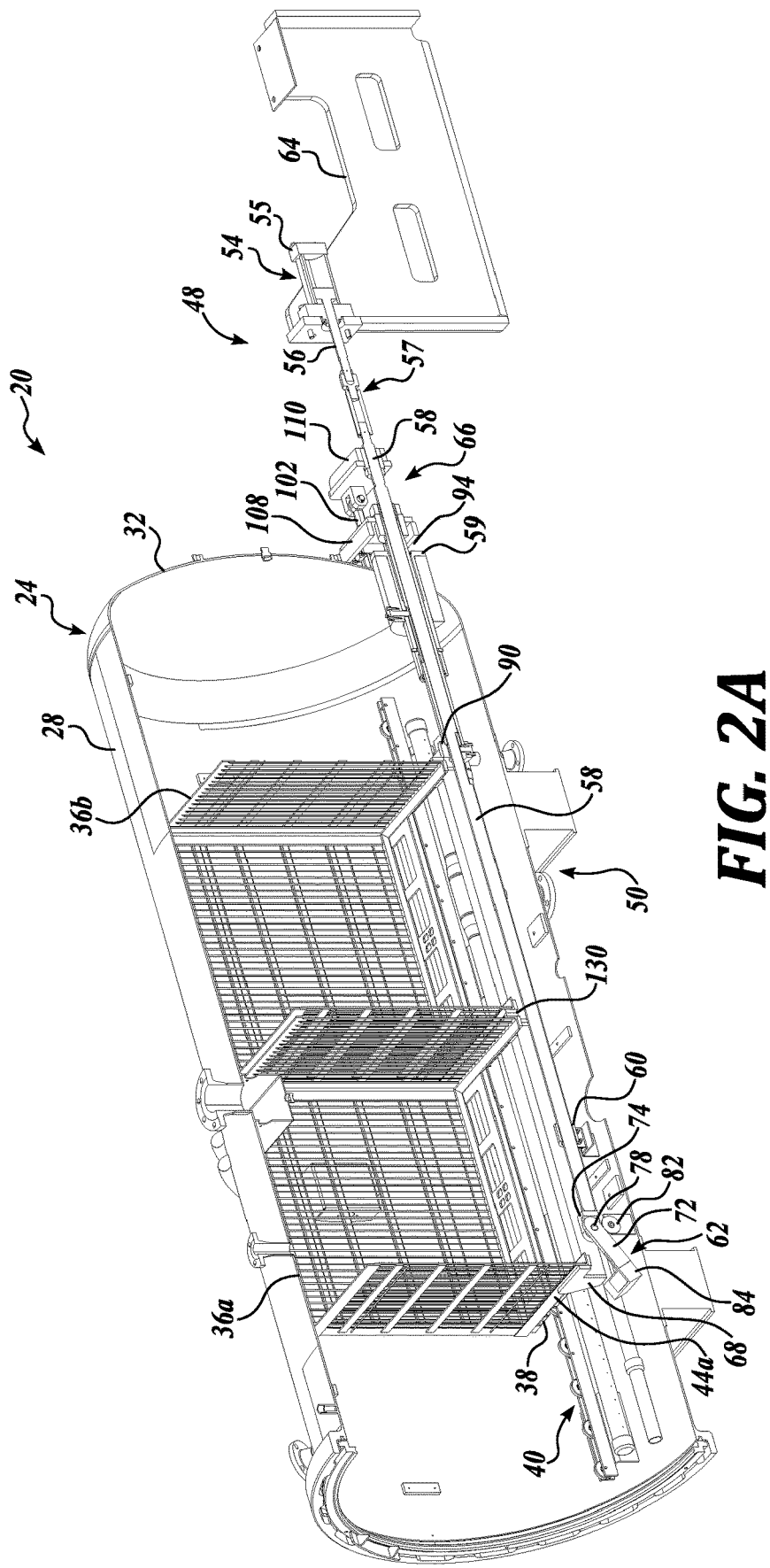
FIG. 2A is an isometric cross-sectional view of the retort having a retort agitation system shown in FIG. 1, wherein the retort agitation system is shown in a first, loading/unloading position.
Figure 2B:
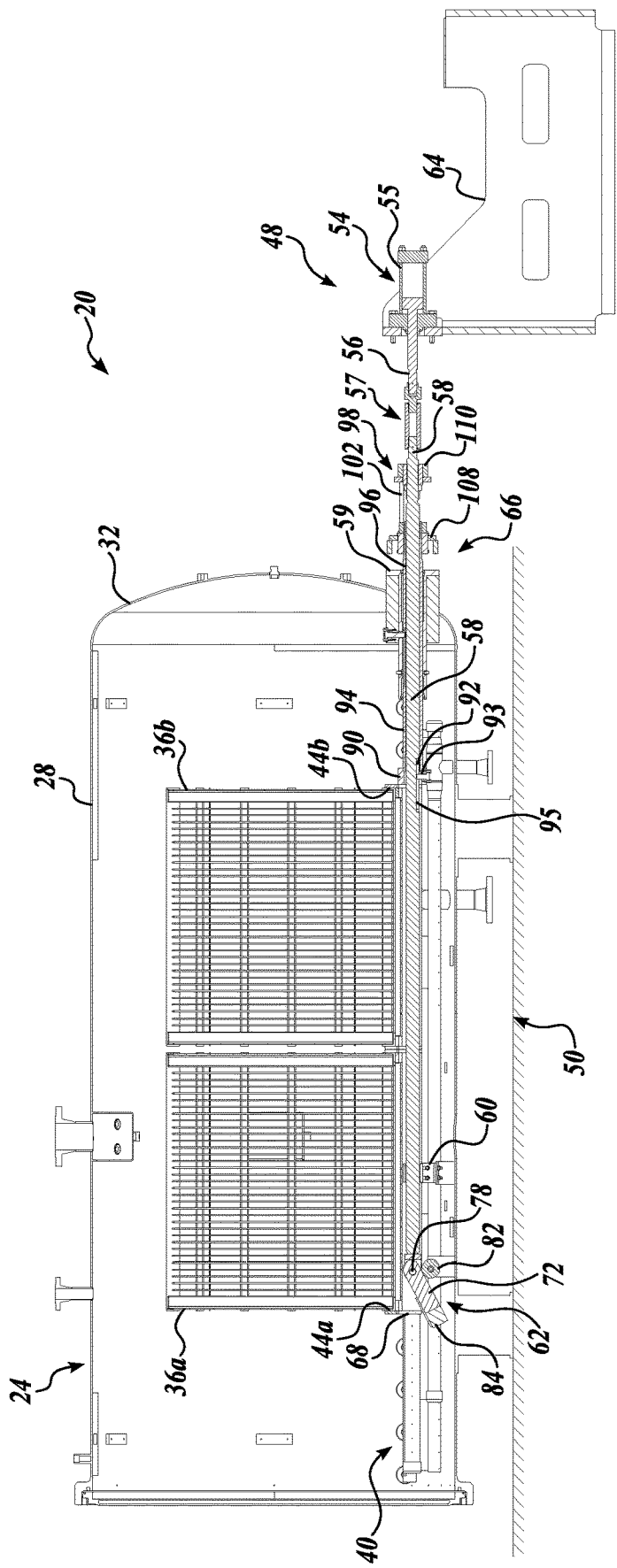
FIG. 2B is a side view of the retort having a retort agitation system shown in FIG. 2A.
Figure 2C:
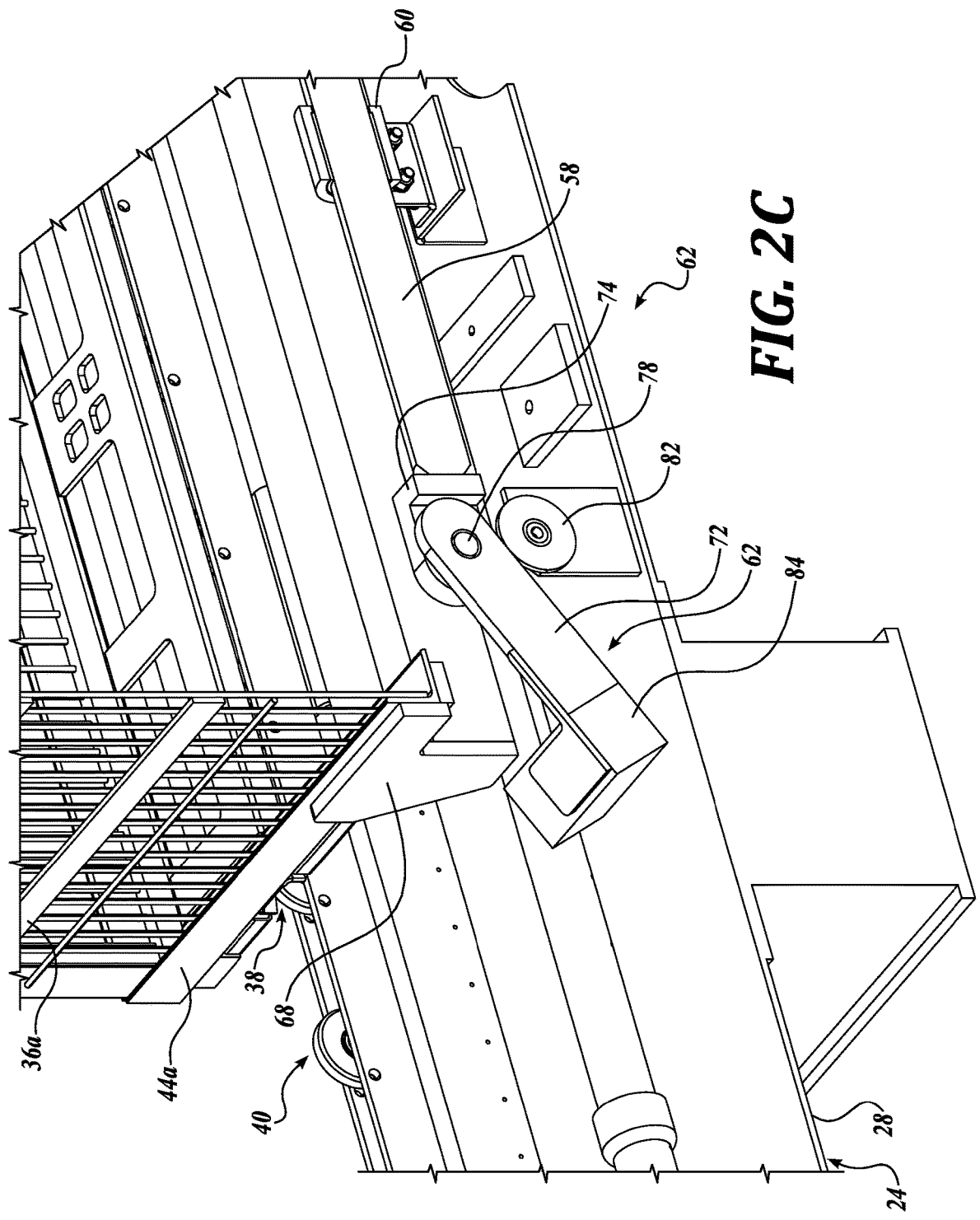
FIG. 2C is an isometric view of a first clamping subassembly of the retort having a retort agitation system shown in FIG. 2A.
Figure 2D:
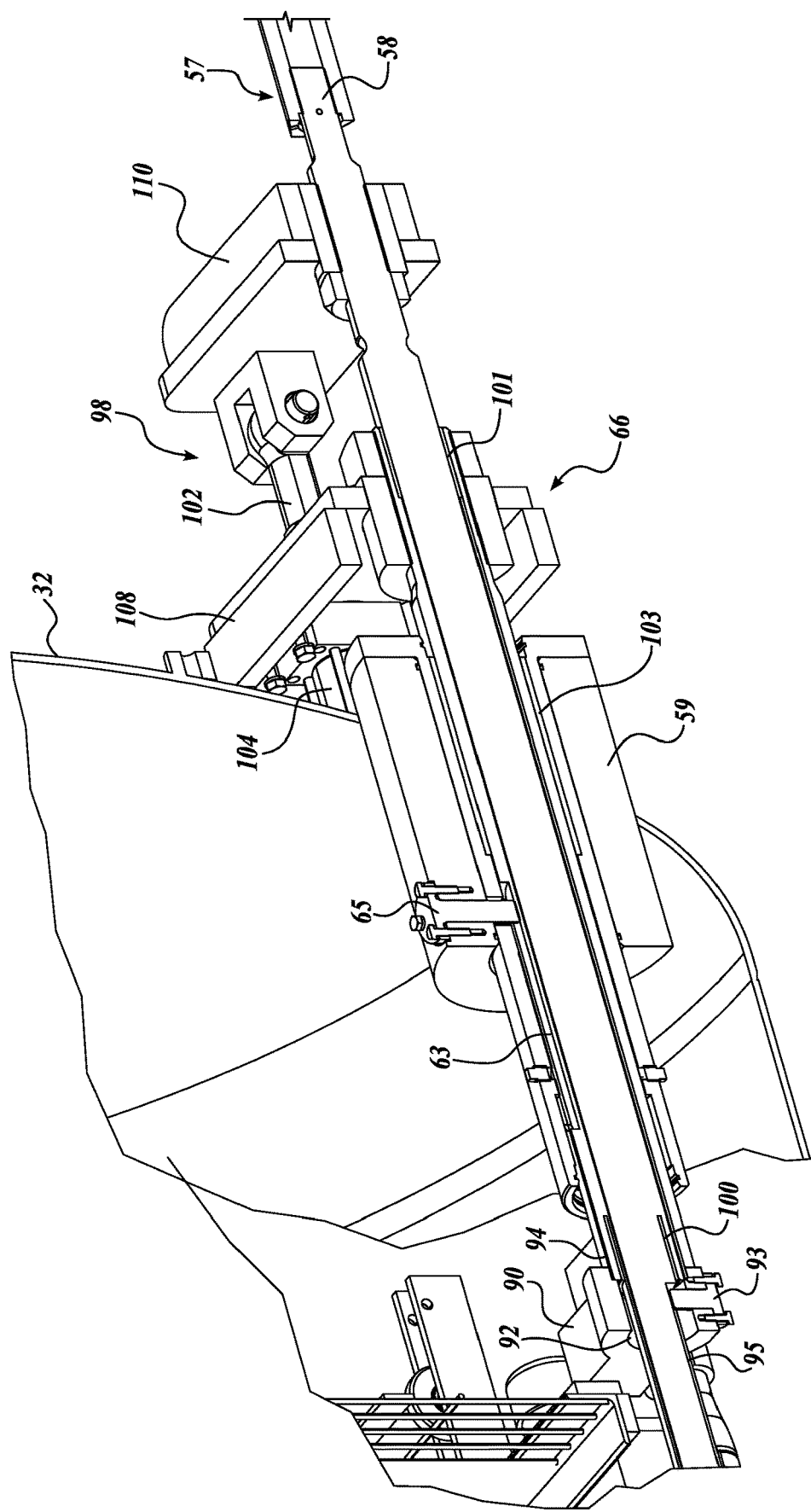
FIG. 2D is an isometric view of a second clamping subassembly of the retort having a retort agitation system shown in FIG. 2A.

Referring to FIG. 2D, the rod sealing/bushing member 59 may also include an anti-rotation feature to substantially prevent rotation of the clamping rod 94 about its longitudinal axis. For instance, a first keyed slot 63 may be defined along a length of the clamping rod 94 that receives a key 65 extending transversely through the rod sealing/bushing member 59. Moreover, the second basket stop 90 may include an anti-rotation feature to prevent the reciprocating rod 58 from rotating about its longitudinal axis, such as a key 93 extending transversely through the cylindrical body of the second basket stop 90 that is receivable within a slot 95 extending along a length of the reciprocating rod 58.

The clamping rod 94 is moveable toward and away from the rear basket 36b through any suitable drive mechanism. For instance, the clamping rod 94 may be moved by a hydraulic linear actuator 98 having a piston rod 102 extending from a cylinder 104. However, it should be appreciated that other mechanisms may instead be used, such as an electric linear actuator, a servo motor, a pneumatic/hydraulic piston, or any other mechanical actuator that is configured to impart a force to move rod 94 in a linear direction along the length of rod 58.

In one aspect, the hydraulic linear actuator 98 may include a position sensor or feedback device for monitoring the linear position of the piston rod 102 (and therefore the clamping rod 94) during the thermal process. For instance, a linear encoder may be used to sense the linear position of the piston rod 102 and to output one or more signals indicative of the rod position to an integrated or separate (wired or wireless) controller (not shown). The controller may be configured to, in response to the one or more encoder signals, output one or more signals to the hydraulic linear actuator 98 for activating and controlling the movement of the clamping rod 94.

The hydraulic linear actuator 98 is arranged such that the piston rod 102 moves the clamping rod 94 linearly toward and away from the rear basket 36b as the piston rod 102 is extended and retracted, respectively, from the cylinder 104. This may be carried out in any suitable manner. For instance, in the depicted embodiment, the hydraulic linear actuator 98 extends between a first rod attachment member 108 secured to the clamping rod 94 and a second rod attachment member 110 secured to the reciprocating rod 58. As the piston rod 102 is extended, the first rod attachment member 108 and the clamping rod 94 collectively move away from the second rod attachment member 110 and toward the rear basket 36b. At the same time, the second rod attachment member 110 remains in a fixed position on the reciprocating rod 58. The piston rod 102 may be extended until the second basket stop 90 defined at the end of the clamping rod 94 engages and imposes a clamping force on the rear basket 36b.

Figure 6:
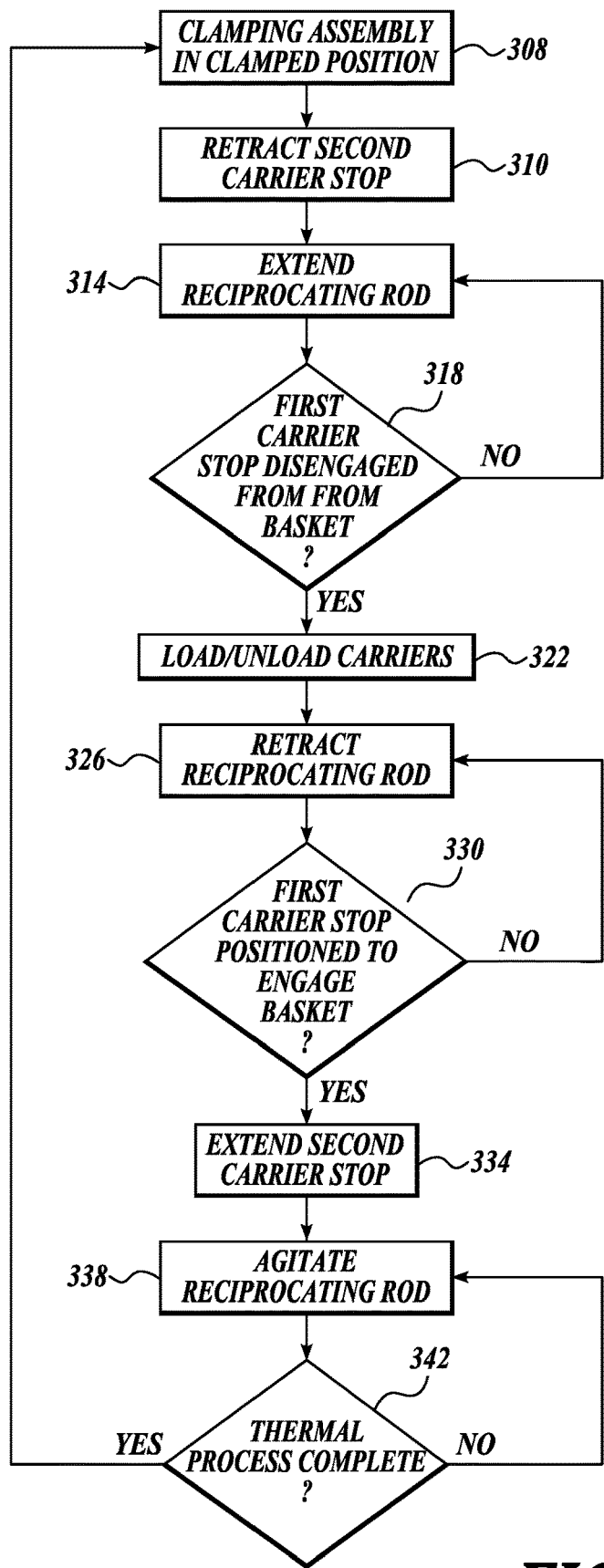
FIG. 6 is an exemplary method for agitating a load within a retort having a having a retort agitation system shown in FIGS. 1-4.
Figure 7:
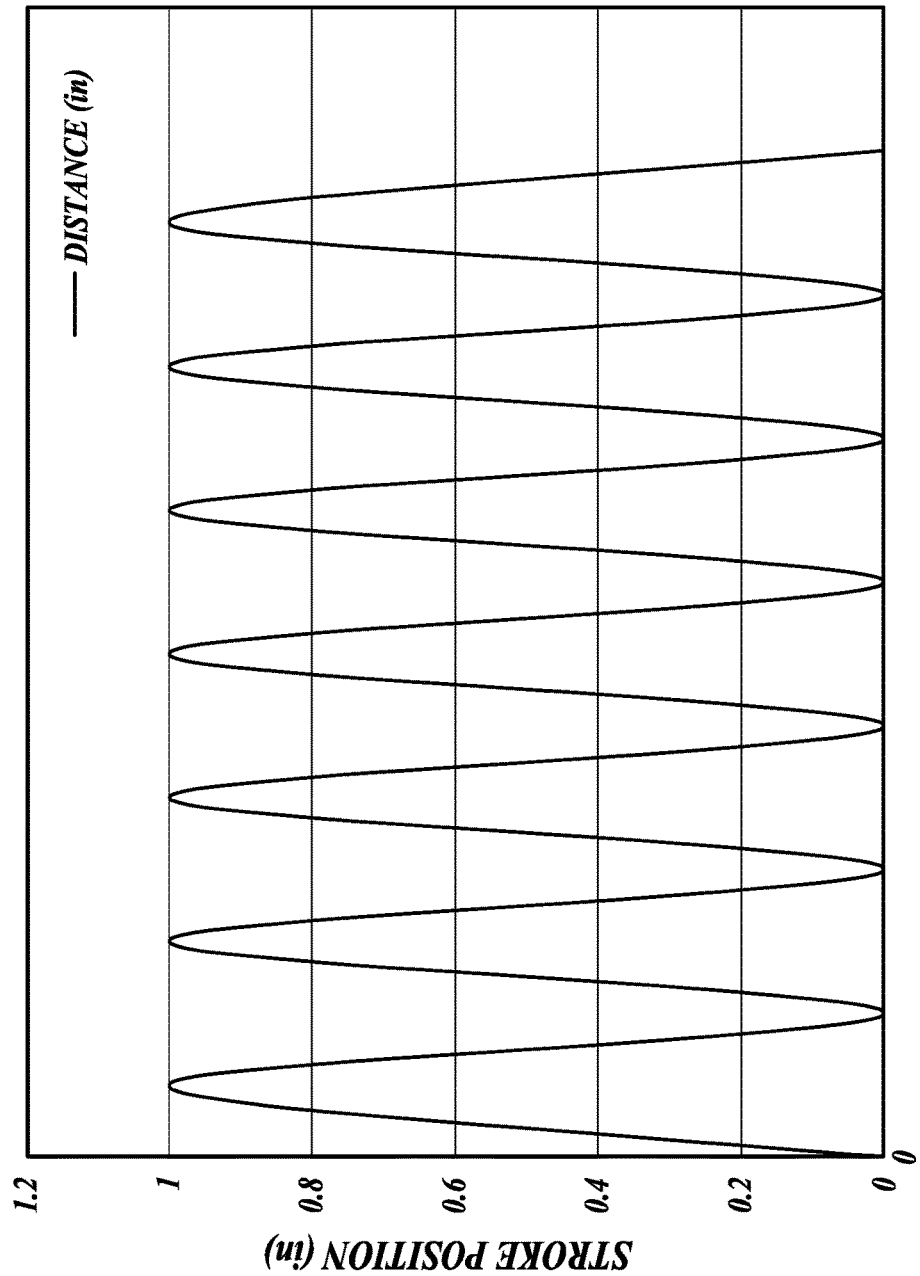
FIG. 7 is a graph showing a first exemplary non-sinusoidal agitation pattern for thermal processing a load within a retort.

In a clamping position, as shown in FIGS. 4A-4B, the first and second basket stops 84 and 90 impart opposing clamping forces on the front and rear baskets 36a and 36b to secure the baskets together and to secure the baskets to the reciprocating rod 58 for agitation. Suitable spacers 130, such as bumpers, gaskets, etc., may be disposed between the front and rear baskets 36a and 36b to provide sufficient bearing area for the clamping force exerted on the baskets when they are being agitated, and/or to allow thermal processing fluid to pass between the baskets 36a and 36b for optimal thermal processing. Referring to FIG. 6, an exemplary method for directly securing (or detaching) the baskets 36 to (or from) the reciprocating assembly 48 for agitation will now be described. The method of securing the baskets 36 may start after the clamping assembly 50 is in a first, clamped position at step 308, wherein the first and second clamping subassemblies 62 and 66 cooperatively impose a linear clamping force on the baskets 36, as shown in FIGS. 4A-4B. This may be at the end of a thermal process of a load (e.g., commercial sterilization of food products contained in baskets or trays). Instead, the clamping assembly 50 may be in the first, clamped position with no baskets 36 yet loaded into the vessel 24.

Regardless, with the clamping assembly 50 in a first, clamped position, the method includes initial steps for moving the clamping assembly 50 into a second, unclamped position such that carriers, such as baskets 36 may be unloaded from or loaded into the vessel 24. To move the clamping assembly 50 into the second, unclamped position, at step 310 the second basket stop 90 is retracted with the corresponding retraction of the piston rod 102 of the hydraulic linear actuator 98 to release the clamping force exerted by the clamping assembly 50 on the baskets 36.

Referring to FIGS. 3A-3C, the second basket stop 90 is shown retracted rearwardly on the reciprocating rod 58 and disengaged from the rear basket 36b. The stroke length of the piston rod 102 may be predefined to ensure that there will be sufficient clearance to extend the reciprocating rod 58 and allow the first clamping subassembly 62 to disengage the front basket 36a. In other words, there is sufficient clearance between the axial position of the rear basket 36b and the retracted second basket stop 90 such that the second basket stop 90 can travel forward with the reciprocating rod 58 without engaging the rear basket 36b in the next step 314.

In that regard, when the second basket stop 90 is retracted, the reciprocating rod 58 can be extended, or moved forward within the vessel 24 by the drive mechanism 54, as indicated in step 314. As the reciprocating rod 58 is extended, the first clamping subassembly 62 disengages the front basket 36a, as shown in FIGS. 2A-2C. More specifically, the pivot arm 72 moves along a roller plane defined by the pivot roller 82 toward the front of the vessel 24 until the first pivot pin 78 is substantially aligned with the pivot roller 82. Such alignment may occur with the reciprocating rod 58 extended to a first predetermined stroke length of the drive mechanism 54. At this point, the pivot arm 72 can rotate downwardly about the axis of the first pivot pin 78. As the pivot arm 72 rotates downwardly, the first carrier or basket stop 84 disengages from and moves out of the forward moving path of the front basket 36a, as indicated by step 318 and as shown in FIGS. 2A-2C. A sensor(s) of the drive mechanism 54 can be used to track the linear position of the piston rod 56 (and thus the reciprocating rod 58) to indicate when it has been extended the predetermined first stroke length; and therefore, when the pivot arm 72 has pivoted downwardly.

Once the reciprocating rod 58 extends the first predetermined stroke length and the first basket stop 84 disengages from and moves out of the forward moving path of the front basket 36a, as indicated by steps 314 and 318, the baskets 36 can be unloaded from and/or loaded into the vessel 24, as indicated by step 322. When the baskets 36 are loaded into the vessel 24, the baskets 36 are loaded onto the roller assemblies 40 and moved toward the rear of the vessel 24 until the rear basket 36b engages the second basket stop 90. The clamping assembly 50 may then be moved back into the first, clamped position such that the baskets may be agitated during thermal processing.

To move the clamping assembly 50 back into the first, clamped position, the reciprocating rod 58 is retracted at step 326 to correspondingly move the pivot arm 72 rearwardly. The pivot arm 72 moves along a roller plane defined by the pivot roller 82 toward the rear of the vessel 24 while pivoting upwardly about the axis of the first pivot pin 78. The reciprocating rod 58 is retracted a second predetermined stroke length of the drive mechanism 54 until the first basket stop 84 engages the clamp engagement plate 68 of the front basket 36a, as indicated in step 330 and as shown in FIGS. 3A-3C. A sensor(s) of the drive mechanism 54 can be used to track the linear position of the piston rod 56 (and thus the reciprocating rod 58) to indicate when it has been retracted the second predetermined stroke length to rotate the pivot arm 72 upwardly.

As the reciprocating rod 58 is retracted at step 326, the entire second clamping subassembly 66 retracts as well. Thus, once the reciprocating rod 58 is retracted to engage the first basket stop 84 with the clamp engagement plate 68 of the front basket 36a, as indicated in step 330, the drive mechanism of the second clamping subassembly 66 is activated in step 334 to move the second basket stop 90 forward along the reciprocating rod 58. The second basket stop 90 is moved forward along the reciprocating rod 58 from the first position, where the second basket stop 90 is disengaged from the rear basket 36b (see FIGS. 3A-3B and 3D), into the second position, where the second basket stop 90 is engaged with and imposes a clamping force on the rear basket 36b (see FIGS. 4A-4B).

More specifically, the clamping rod 94 is moved forwardly when the piston rod 102 of the hydraulic linear actuator 98 extends from the cylinder 104 a third predetermined stroke length. The piston rod 102 extends the third predetermined stroke length (detectable by sensor(s)) so that the second basket stop 90 is engaged with and imposes a clamping force on the rear basket 36b. Since the pivot arm 72 is already in the up position, the first and second clamping subassemblies 62 and 66 cooperatively impose a linear clamping force on the baskets 36 to secure the baskets 36a and 36b together and to secure the baskets to the reciprocating rod 58. In other words, the front and rear baskets 36a and 36 are clamped between the first and second basket stops 84 and 90. In this manner, the reciprocating forces of the drive mechanism 54 can effectively be transferred to the baskets 36 for agitation.

In that regard, at step 338, the reciprocating rod 58 is reciprocated by the drive mechanism 54 to agitate the baskets 36. The baskets 36 are agitated in a customized (optionally non-sinusoidal) pattern until the thermal process has completed, as indicated in step 342. Once the thermal process has completed, the method steps may be repeated to unload the baskets 36 from the vessel 24 and load a new set of carriers (baskets, trays, etc.) into the vessel 24 for thermal processing.

The retort agitation system 20 of the present disclosure includes a reciprocating assembly 48 that is capable of varying the stroke length, speed (stroke position/time) frequency (cycles/minute), acceleration, and G-force of the load to create a custom (optionally non-sinusoidal) agitation pattern or motion profile for the specific food product. For instance, the stroke length can be adjusted (lengthened or shortened) during the thermal process to accommodate a viscosity change in the food product. As a specific example, as a food product heats up, the viscosity of the product may decrease, and a longer stroke length might better match the natural "sloshing" motion of the food product.

The agitation speed and/or frequency can also be changed during the agitation motion profile of a food product. For example, it may be beneficial to adjust the agitation speed and/or frequency when the food product has a fluid inside the container that heats quickly, but it also has particles that heat at a slower rate. Such a food product may benefit from a higher agitation speed and/or frequency at the beginning of the thermal process to help the fluid in the container heat quickly, and a slower speed and/or frequency once the fluid is heated and the particles continue to heat. If a slower agitation speed and/or frequency can be used, the agitation equipment would endure less wear and tear, and energy is saved.

The agitation motion profile may also be designed to allow for the load to be agitated at different acceleration and G-forces during the thermal process. For instance, certain food products that become fragile, soft or delicate during the thermal process can have an agitation motion profile with a high acceleration/G-force at the beginning of the thermal process (such as during some or all of come-up), and then once the food product starts to soften the agitation motion profile can be changed to have a lower (gentler) acceleration/G-force to avoid damaging the food product.

The agitation motion profile with the customized stroke length, speed, frequency, acceleration, and/or G-forces can be applied as a constant variable over a specific time period or phase of the thermal process. For example, an aggressive agitation profile can be used during an initial heating of product, a less aggressive agitation profile can be used when the food product is hot because it can become more fragile, and then finally a more aggressive agitation profile can be used once the product has cooled or has become thicker due to starches being released during the cooking process. The agitation motion profile with the customized stroke length, speed, frequency, acceleration, and/or G-forces can also be applied as a variable function that, for instance, increases and decreases over multiple strokes and then repeats in a pattern during at least one of the initial product heating phase (come-up), the cook phase, and the cool phase.

FIGS. 8-15 depict non-limiting examples of non-sinusoidal agitation patterns for thermal processing a food product within a retort. The non-sinusoidal agitation patterns graphically depicted in FIGS. 8-15 may be carried out with a reciprocating assembly similar to reciprocating assembly 48 described above, or with any other suitable reciprocating assembly.

Figure 8:
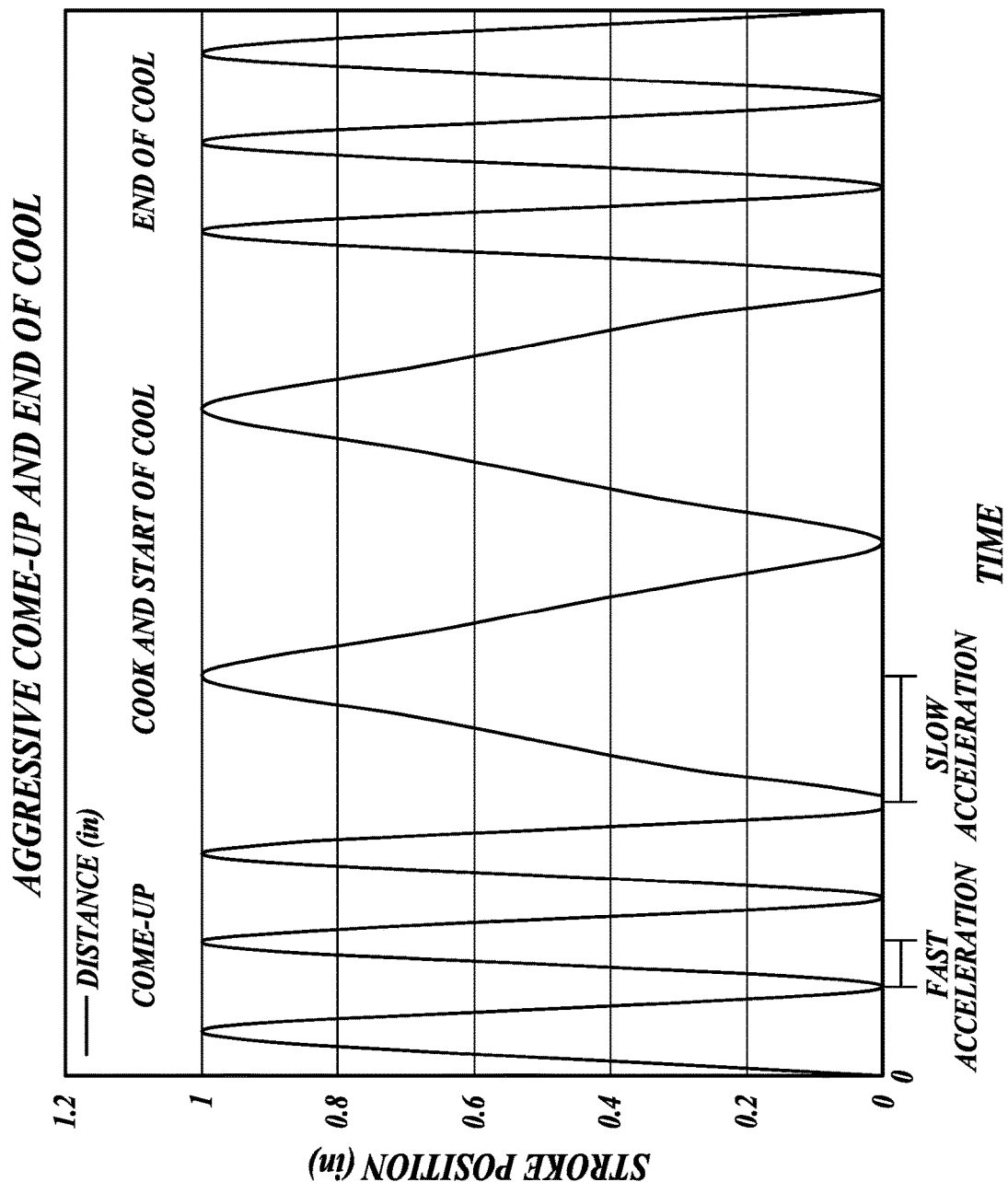
FIG. 8 is a graph showing a second exemplary non-sinusoidal agitation pattern for thermal processing a load within a retort.

The exemplary agitation motion profile graphically depicted in FIG. 8 includes more intense accelerations resulting from a higher speed in the come-up and end of cool phases, and gentler accelerations from a lower speed during the cook phase and a first part of the cool phase. In this exemplary agitation motion profile the stroke length and frequency remains substantially constant. Such an agitation motion profile may be beneficial for a food product that becomes fragile when heated, as discussed above. In an alternative embodiment, the cook phase and first part of the cool phase may include more intense accelerations (higher speed) for a less fragile product, whereas gentler accelerations may be used during the come-up and end of cool phases. The accelerations may instead be varied during some or all of the phases as needed to efficiently process the food product.

Figure 9:
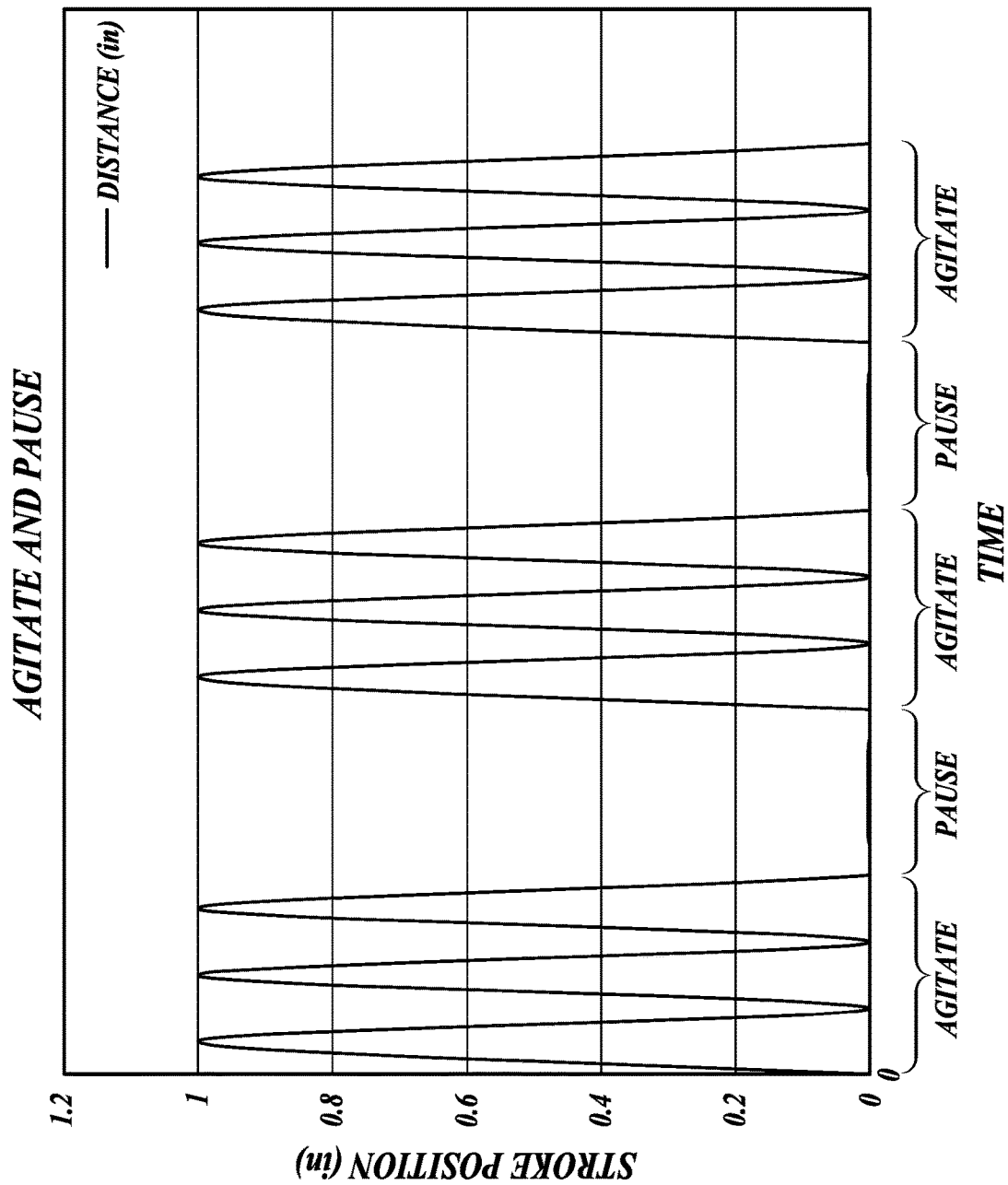
FIG. 9 is a graph showing a third exemplary non-sinusoidal agitation pattern for thermal processing a load within a retort.

The exemplary agitation motion profile graphically depicted in FIG. 9 is an "agitate and pause" repeated profile, which may be used during some or all of the thermal processing phases, and for the total phase or a portion of the phase. More specifically, the load may be agitated back and forth along the retort several times, paused, and then agitated again in a repeated or varied pattern. A "pause" is understood to be a stop in the movement of the load that is more than an interruption of movement that occurs when the load reverses directions (i.e., when the load technically comes to a stop before changing directions). For instance, a "pause" may include a stop in movement that is greater than, for instance, 0.1 seconds.

Such an "agitate and pause" profile could be used to periodically aggressively agitate or shake the food product to mix its contents (for improved heat transfer), but to pause the aggressive agitation/mixing to help maintain the integrity of the food product. It can be appreciated that a constant aggressive agitation/mixing of the food (i.e., it is shaken constantly during the process) might cause the food product to deteriorate. The agitation motion profile graphically depicted in FIG. 9 could include one "hard shake" and a pause, several hard shakes and a pause, or any other combination or pattern suitable for the food product. The stroke length, speed, frequency, acceleration, and G-force remain substantially constant during the agitation portion of the agitation motion profile graphically depicted in FIG. 9; however it should be appreciated that one or more of those could instead be varied.

Figure 10:
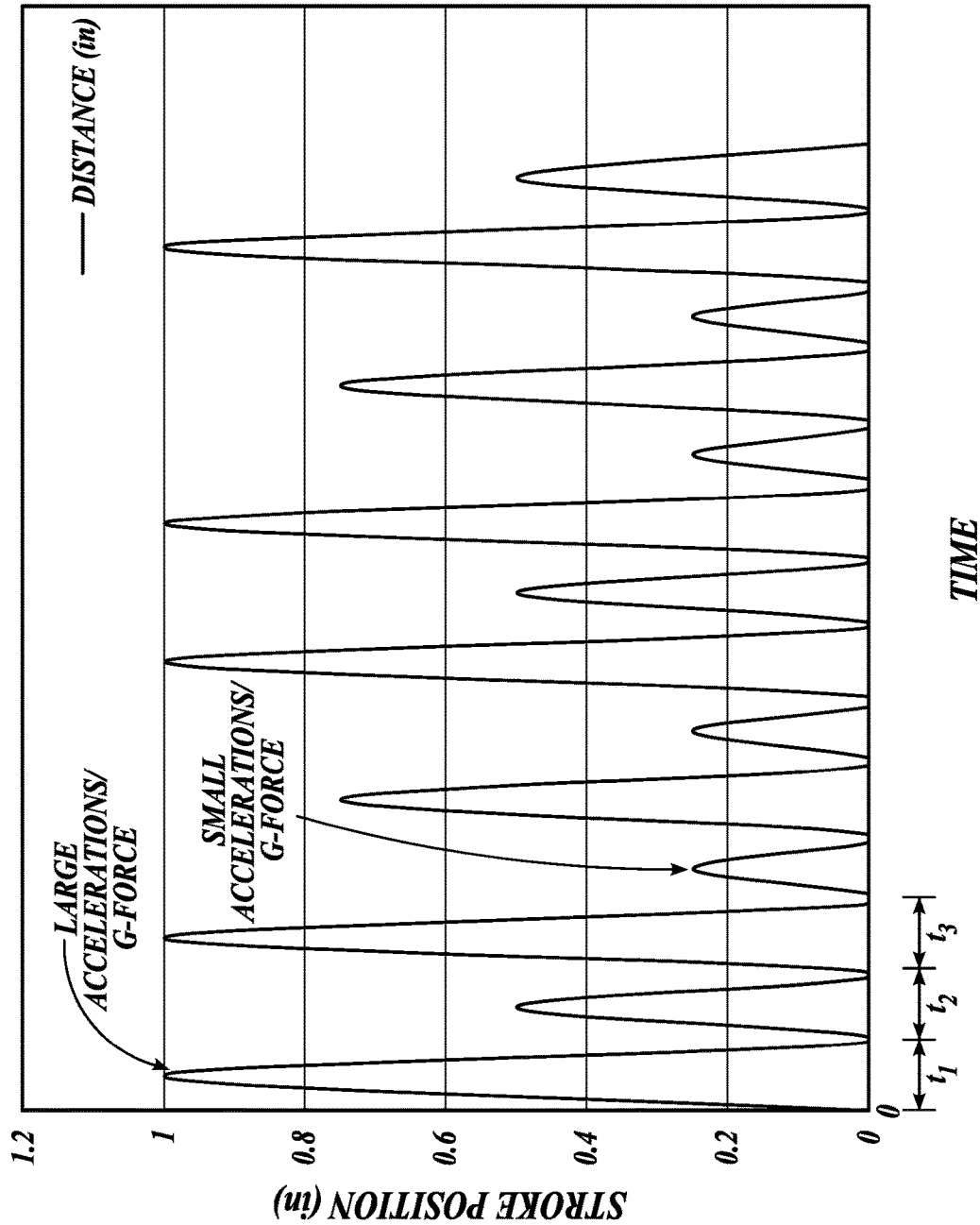
FIG. 10 is a graph showing a fourth exemplary non-sinusoidal agitation pattern for thermal processing a load within a retort.

The exemplary agitation motion profile graphically depicted in FIG. 10 is a "variable stroke length" agitation motion profile, which may be used during some or all of the thermal processing phases, and for the total phase or a portion of the phase. More specifically, the load may be agitated back and forth along the retort while varying the stroke length and speed for each cycle (where one cycle equals one complete forward motion and one complete reverse motion to return the load to the home position) but while keeping the frequency (cycles/minute) constant, resulting in larger or smaller accelerations. More specifically, by keeping the frequency substantially constant, the agitation motion profile would include larger accelerations (G-force) imposed on the food product for a longer stroke length per unit of time, and smaller accelerations (G-force) for a shorter stroke length per unit of time. Such an agitation motion profile can be achieved as graphically depicted in FIG. 10, where the profile has a substantially constant frequency (i.e., t1, t2, and t3 being substantially equal) but each cycle includes a different stroke length from the previous cycle (such as one of three different stroke lengths). The pattern could be repeated as shown. For instance, the variable stroke length agitation motion profile could include four strokes at 0.5", four strokes at 1", six strokes at 0.6", with each stroke occurring within about the same time duration, and then repeat. Such a patterned variable stroke length agitation motion profile resulting in different accelerations imposed on the food product could be beneficial for a food product that has different viscosities as the food product heats and cools.

Figure 11:
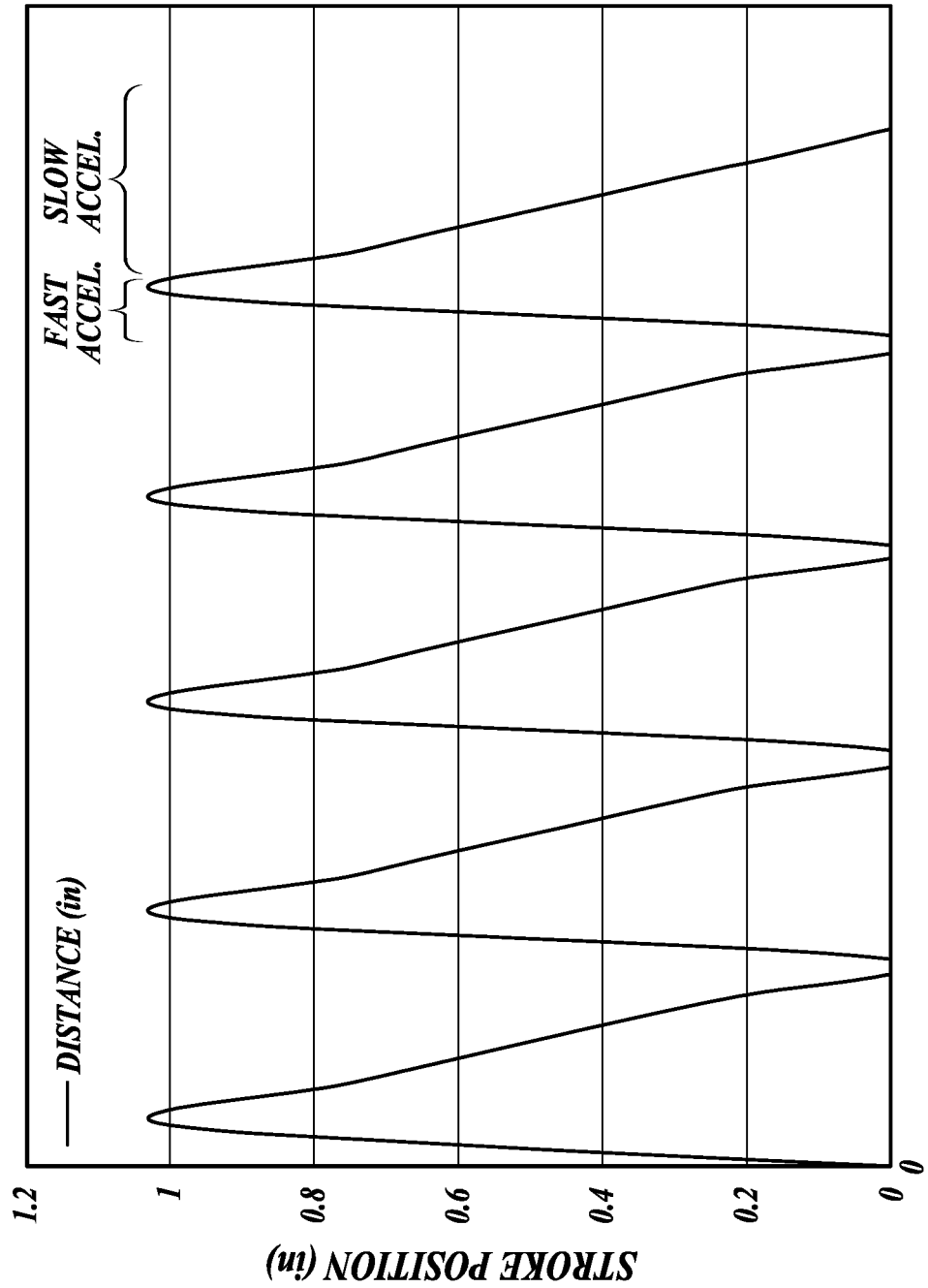
FIG. 11 is a graph showing a fifth exemplary non-sinusoidal agitation pattern for thermal processing a load within a retort.

The exemplary agitation motion profile graphically depicted in FIG. 11 is a "fast acceleration in one direction" profile, which may be used during some or all of the thermal processing phases, and for the total phase or a portion of the phase. More specifically, the load may be agitated back and forth along the retort with a generally fast acceleration in a first direction (i.e., when extending the reciprocating rod 58), and a slow acceleration a (i.e., when retracting reciprocating rod 58) in the return direction. In the exemplary agitation motion profile graphically depicted in FIG. 11, the speed and frequency remain substantially constant, although they could instead be varied. Such a "fast acceleration in one direction" agitation motion profile could be beneficial for containers like pouches, tubs or other food containers that typically slide back and forth on or in a carrier during agitation.

For instance, if the carrier is a tray, such as the tray 236 shown in FIG. 5, the in-container food products are loaded into pockets 240 of the tray 236 for thermal processing. A sufficient tolerance is typically defined between the edges of the pockets 240 and the food product container to accommodate automatic or robotic loading of the container into the pocket. This "slop" allows the in-container food product to move back and forth within the pocket 240 during agitation, scuffing or abrading certain containers (such as pouches) during the process, especially when heated. Accordingly, the agitation motion profile can be customized to help maintain the position of the container against an edge of the pocket such that any abrasion or scuffing of the container is avoided or minimized.

More specifically, by quickly accelerating the food container in the first direction with a slow deceleration at the end of the stroke, and returning in the opposite direction with a slow acceleration and a fast deceleration at the end of the stoke, the food container would get pushed up against one side or edge of the retort tray pocket and stay at that edge for the duration of the thermal process (or for a certain portion of the thermal process, as desired). In other words, the agitation force is substantially applied in only one direction. In this manner, a clamping mechanism or the like is not needed to keep the container in a secured position against an edge of the tray pocket. It should be appreciated that this agitation motion profile may also be used to secure any suitable container (such as cans or bottles) within any suitable carrier (such as a basket).

The agitation motion profile of a food product may also be varied by imposing pauses, stops, or impulses on the load during one or more phases of thermal processing. For instance, the load may be moved in one direction at a high speed, paused or stopped, then moved in the same direction at a slower speed to impose varied G-forces on the food product. The magnitude, stroke length, and frequency of the impulse may be varied to create a desired agitation effect on the food product mass inside the container.

Figure 12:
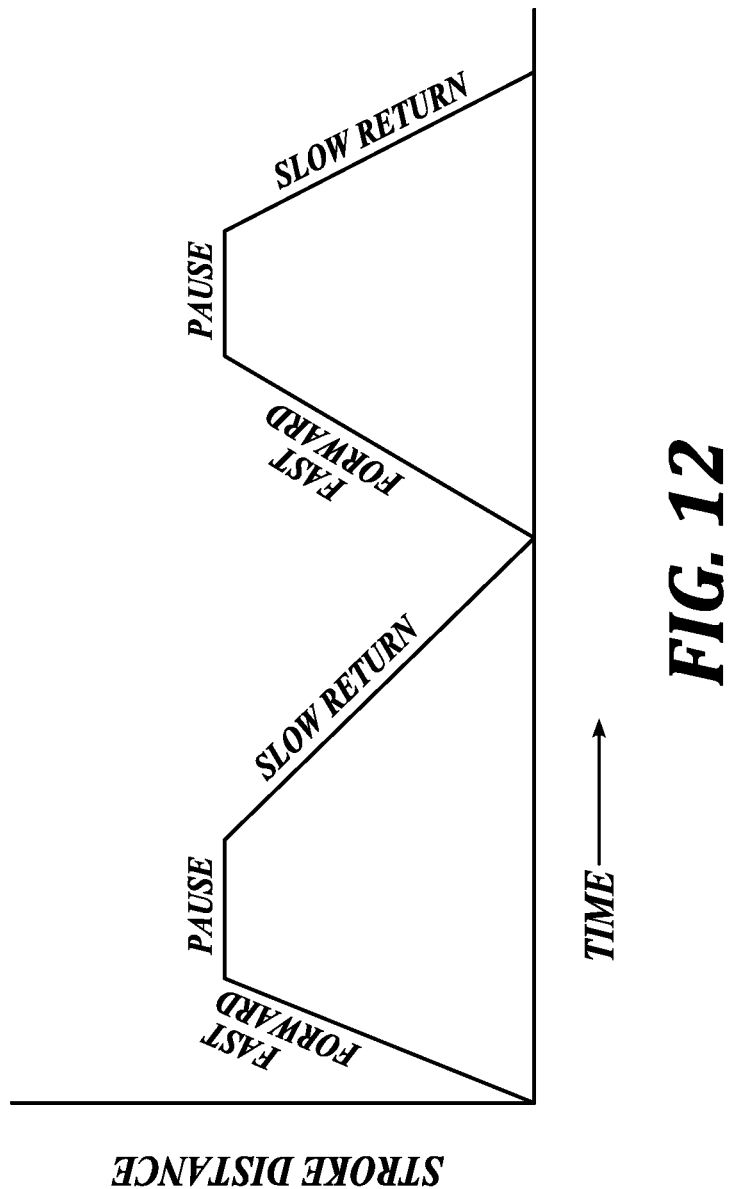
FIG. 12 is a graph showing a sixth exemplary non-sinusoidal agitation pattern for thermal processing a load within a retort.

The exemplary agitation motion profile graphically depicted in FIG. 12 is a "fast acceleration in one direction" profile that is substantially similar to the profile depicted in FIG. 11, which may be used during some or all of the thermal processing phases, and for the total phase or a portion of the phase. In the agitation motion profile graphically depicted in FIG. 12, however, the agitation is paused or stopped between the fast acceleration in the first direction (i.e., by extending the reciprocating rod 58) and a slow acceleration to return in the second direction (by retracting the reciprocating rod 58). For instance, the load may be moved fast in a first direction, stopped hard, returned at a slower speed, stopped slowly, and then repeated with the same speed and/or frequency or with a different speed and/or frequency as shown. With such an agitation profile, the agitation force is substantially applied in only one direction such that the food container will stay positioned up against an edge of the tray or basket.

Figure 13:
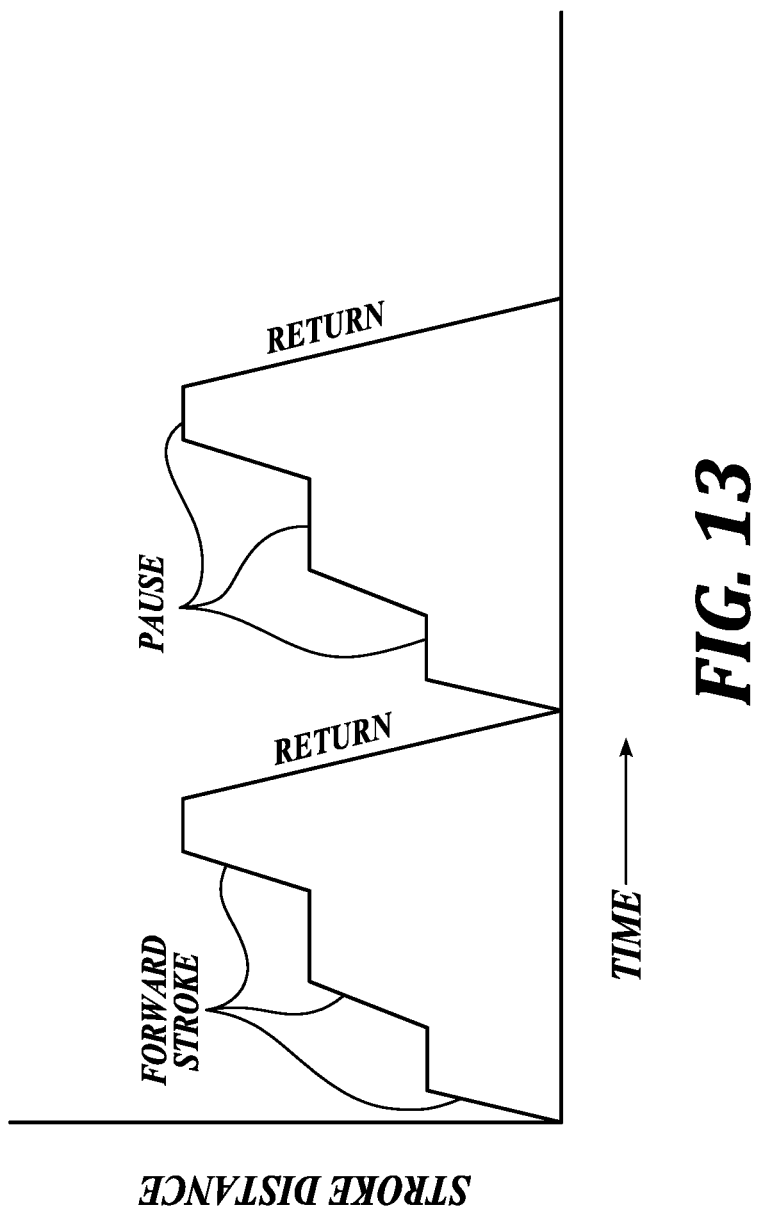
FIG. 13 is a graph showing a seventh exemplary non-sinusoidal agitation pattern for thermal processing a load within a retort.

The exemplary agitation motion profile graphically depicted in FIG. 13 is also a "fast acceleration in one direction" profile that is substantially similar to the profile depicted in FIG. 12 and that may be used during some or all of the thermal processing phases, and for the total phase or a portion of the phase. In the agitation motion profile graphically depicted in FIG. 13, however, the agitation is paused or stopped as it is being moved in the first direction (by extending the reciprocating rod 58) at a fast acceleration before being returned in the second direction (by retracting the reciprocating rod 58) at a slower acceleration. For instance, the load may be moved fast in a first direction, stopped hard, moved fast again in the first direction, stopped hard, moved fast again in the first direction, stopped hard, and then returned at a slower speed and stopped slowly. This pattern may be repeated during some or all of the phases (or a portion of the phase(s)). With such an agitation profile, the agitation force is again substantially applied in only one direction such that the food container will stay positioned up against an edge of the tray or basket. Different motion profiles can be created to accelerate and stop the load multiple times in a "forward" direction, before changing direction and returning the load to a "home" position in a single movement or with multiple stop and starts.

Figure 14:
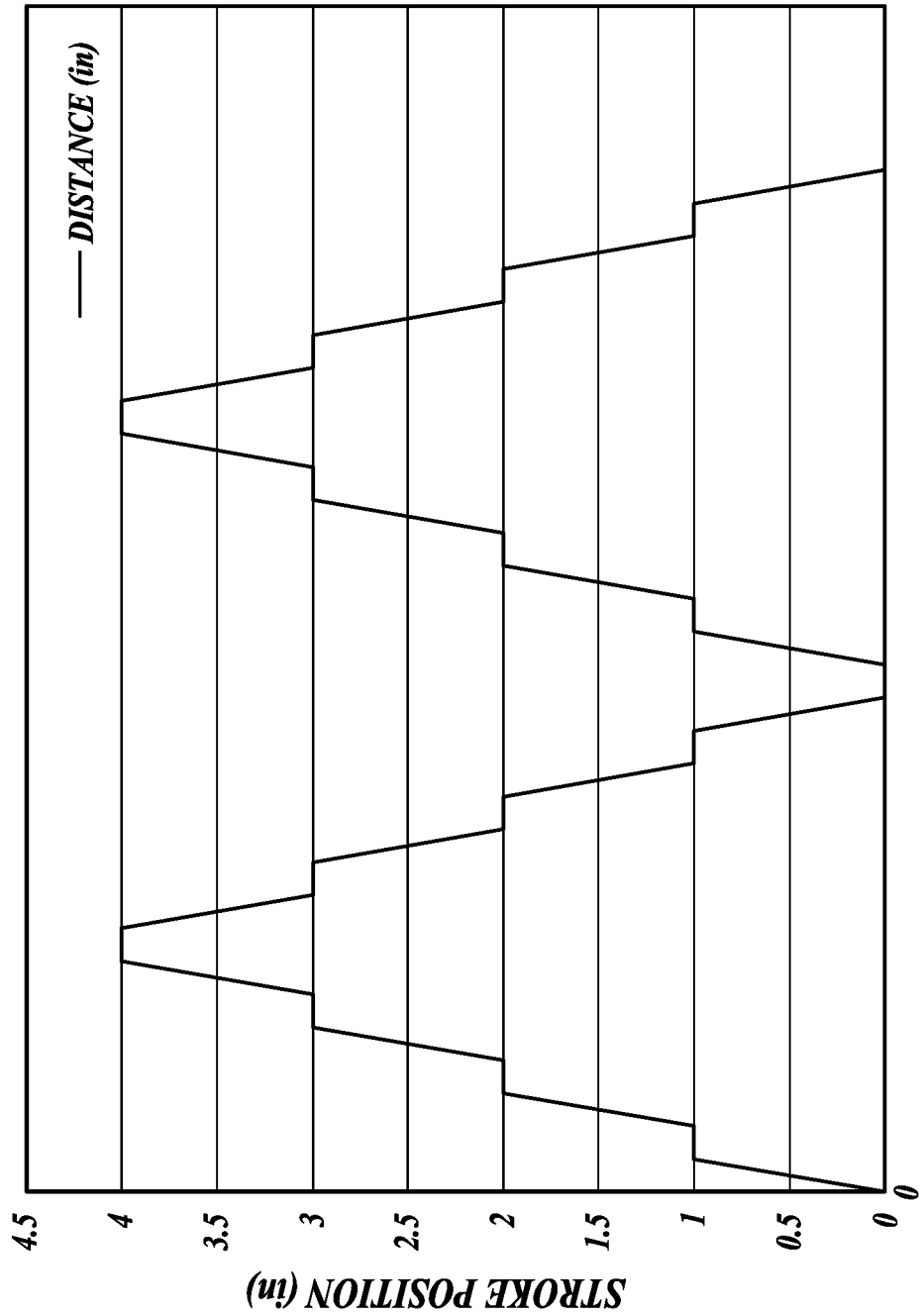
FIG. 14 is a graph showing an eighth exemplary non-sinusoidal agitation pattern for thermal processing a load within a retort.

The exemplary agitation motion profile graphically depicted in FIG. 14 is a "multiple strokes in one direction" profile that is substantially similar to the profile depicted in FIG. 13 in that the load is moved and stopped/paused several times in a first direction (by extending the reciprocating rod 58). However, in the agitation motion profile graphically depicted in FIG. 14, the load is also moved and stopped/paused several times in a second return direction (by retracting the reciprocating rod 58) at a similar speed and stroke length. The agitation motion profile graphically depicted in FIG. 14 may be used during some or all of the thermal processing phases, and for the total phase or a portion of the phase.

Figure 15:
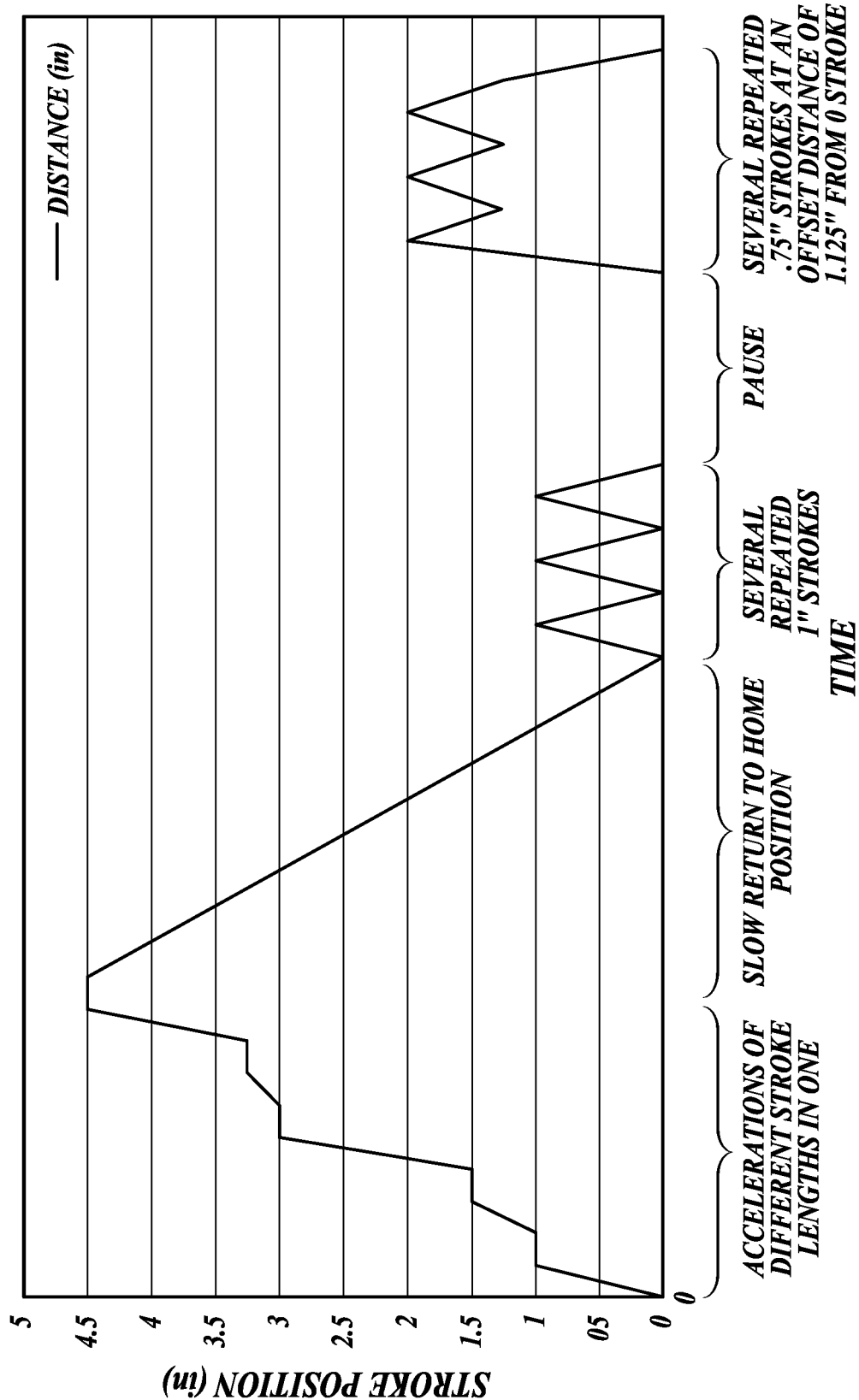
FIG. 15 is a graph showing an ninth exemplary non-sinusoidal agitation pattern for thermal processing a load within a retort

The exemplary agitation motion profile graphically depicted in FIG. 15 is a "combination" agitation motion profile, which may be used during some or all of the thermal processing phases, and for the total phase or a portion of the phase. More specifically, the load may be agitated back and forth along the retort while varying the stroke length, the speed, frequency, acceleration, and/or the G-forces in a repeatable or semi-repeatable pattern. The agitation motion profile of FIG. 15 is a representation of a combination of some or all of the agitation motion profiles discussed above. For instance, the load may be first be moved fast in a first direction, stopped hard, moved less fast in the first direction, stopped hard, moved faster in in the first direction, stopped hard, etc., and then returned at a slower speed to the home position. Once reaching the home position, the load may be agitated back and forth at the same stroke length, speed, and frequency, and then paused. Finally, the load may be agitated at several repeated strokes of the same stroke length, speed, and frequency at a starting point between the home and return positions. This pattern may be repeated during some or all of the phases (or a portion of the phase(s)).

It can be appreciated that the agitation effects of the above-described agitation motion profiles may be achieved with any non-sinusoidal motion, such as a saw tooth profile, an s-curve profile, a trapezoidal profile, etc. Moreover, it should be appreciated that the above-described exemplary agitation motion profiles may be modified or combined as needed to most efficiently and effectively thermally process the specific food product in the containers. Moreover, although the motion profiles are graphically shown in terms of stroke position and time, it can be appreciated that the acceleration and g-force acted upon the food product, which are derivatives of the position and velocity agitation motion profiles as will be described below with respect to FIGS. 16 and 17, are significant factors for imposing the necessary agitation of a food product within the container.

Some or all of the above-described agitation motion profiles may be carried out with certain preferred ranges of stroke length, speed, frequency, and G-force or acceleration, which, either alone or in combination, result in effective agitation. For instance, the stroke length may stay within a broad range of between about one-tenth of an inch (0.10") to about ten inches (10"), or within a narrower subset of that broader range, such as about one-eighth inch (⅛") to about ten inches (10"), about one-tenth of an inch (0.10") to about two inches (2.0"), about a half an inch (0.5") to about one and one quarter inches (1.25") or two inches (2"), or any other range suitable for the intended food product or profile.

The above-listed exemplary stroke length ranges are defined as the distance that the load moves between a start and stop position. As can be appreciated from the above-described exemplary agitation motion profiles, the profile can include several starts and stops in a single direction before returning to the "home position." (See FIGS. 13-15.) As an example, using an agitation motion profile similar to the one graphically depicted in FIG. 13, the load may be moved from the home position forward one inch (1"), stopped, moved forward one and a half inches (1.5"), stopped, moved forward one inch (1"), stopped, moved forward one and a half inches (1.5"), stopped, and then returned five inches (5") to the home position. In that regard, the total cycle length between the home and return position may be the sum of the individual stroke lengths.

The frequency, or cycles per minute for the above-described agitation motion profiles may be carried out within a range of between about 5-200 cycles/minute, and more preferably about 10-200 cycles/minute, and more preferably about 20-100 cycles/minute. As noted above, one cycle is equal to one complete forward motion and one complete reverse motion to return the load to the home position. It should be appreciated that the frequency may be dependent upon the type of agitation motion profile used, and it may be varied throughout the cycle. The G-force for the above-described agitation motion profiles may be within a range of between about 0.05 G-2 G, or more preferably about 0.3 G-1 G.

The agitation motion profiles may be stored in memory in a computer in the form of a recipe computer program module ("recipe module") for the specific food product. The computer may be in wired or wireless communication with the controller of the retort agitation system 20, or the computer may instead be a part of the controller. The memory may store computer-readable, computer executable software/firmware code that, when executed, cause the controller to perform various functions as described herein, such as actuating the variable input drive mechanism 54 to execute a specific agitation motion profile. For instance, the controller may be may be configured to output one or more signals to the drive mechanism 54 for activating and controlling the stroke position, speed, acceleration, length, direction, time to pause between strokes, etc., of the reciprocating rod 58 in response to the execution of one or more recipe modules.

The controller will also be in wired or wireless communication with one or more feedback devices, such as a sensor(s), that will monitor the status, position, etc., of the retort agitation system components 20 to ensure the contained food product is experiencing the correct agitation motion profile, and/or to adjust the profile as needed. For instance, the agitation motion profile may be automatically adjusted for things such as inconsistent frictional forces and ordinary part wear. Of course, there will be limits to the corrections that can be made with an automated system, in which case the retort agitation system 20 may include alarms or other feedback devices that can alert operators when maintenance is needed.

As can be appreciated from the foregoing, the retort agitation system 20 configured to agitate a load in a non-sinusoidal and/or customizable pattern optionally through direct coupling of the agitation system to the load provides several benefits over prior art systems. For instance, prior art systems that use a traditional crank shaft have the G-force variable tied to the rotary crank speed (RPM) and crank length. A standard agitation motion profile for thermal processing a load inside a retort using a traditional crank shaft is sinusoidal, meaning the stroke length remains constant for each cycle (where one cycle equals one complete forward motion and one complete reverse motion to return the load to the home position). Accordingly, the G-force can be increased or decreased only by adjusting the rotational speed (and therefore the strokes/minute) of the crankshaft.

Figure 16A:
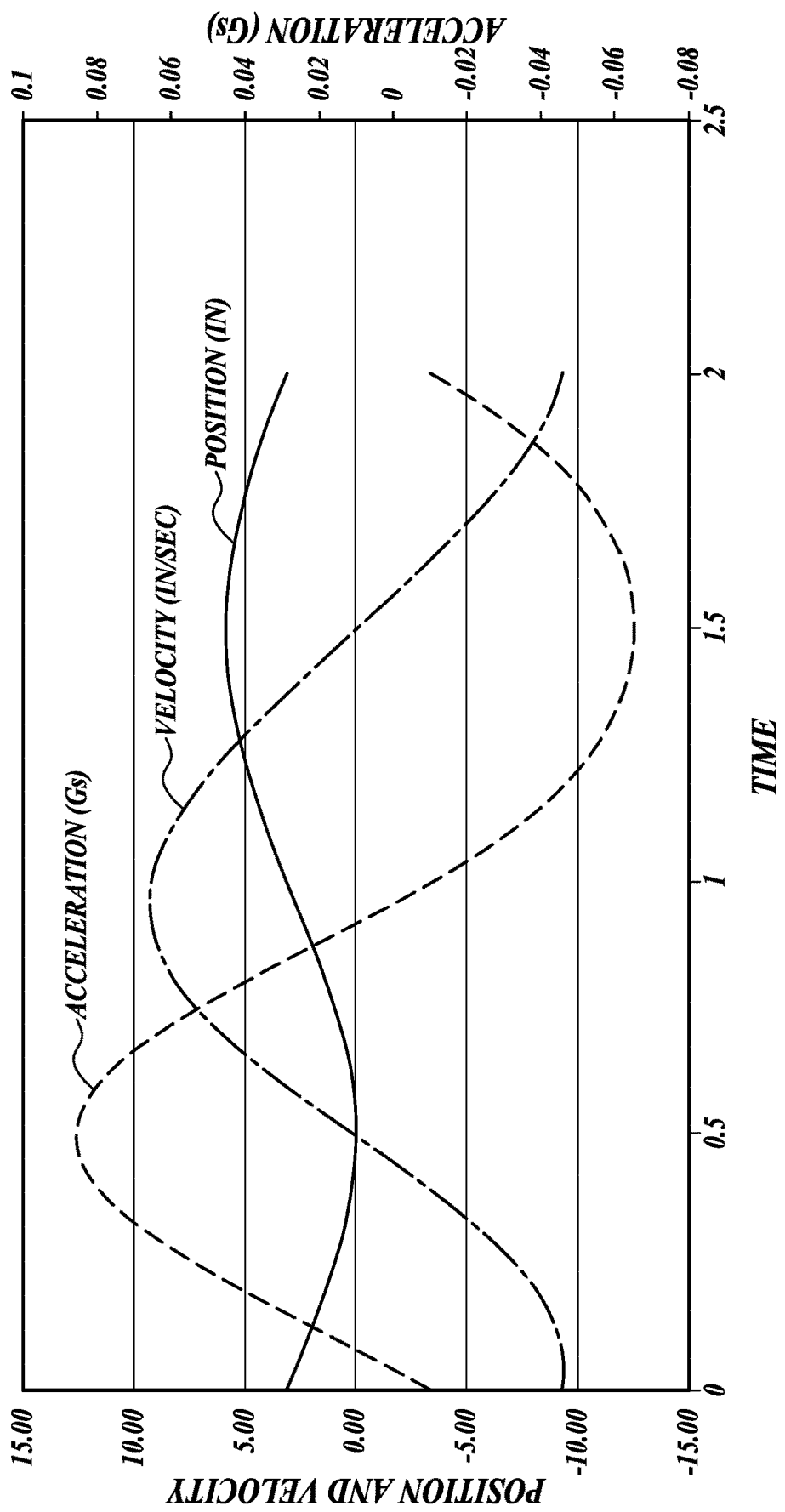
FIG. 16A is a graph showing a prior art position, velocity, and acceleration profile for a sinusoidal agitation pattern for thermal processing a load within a retort at a first rotation crank speed.
Figure 16B:
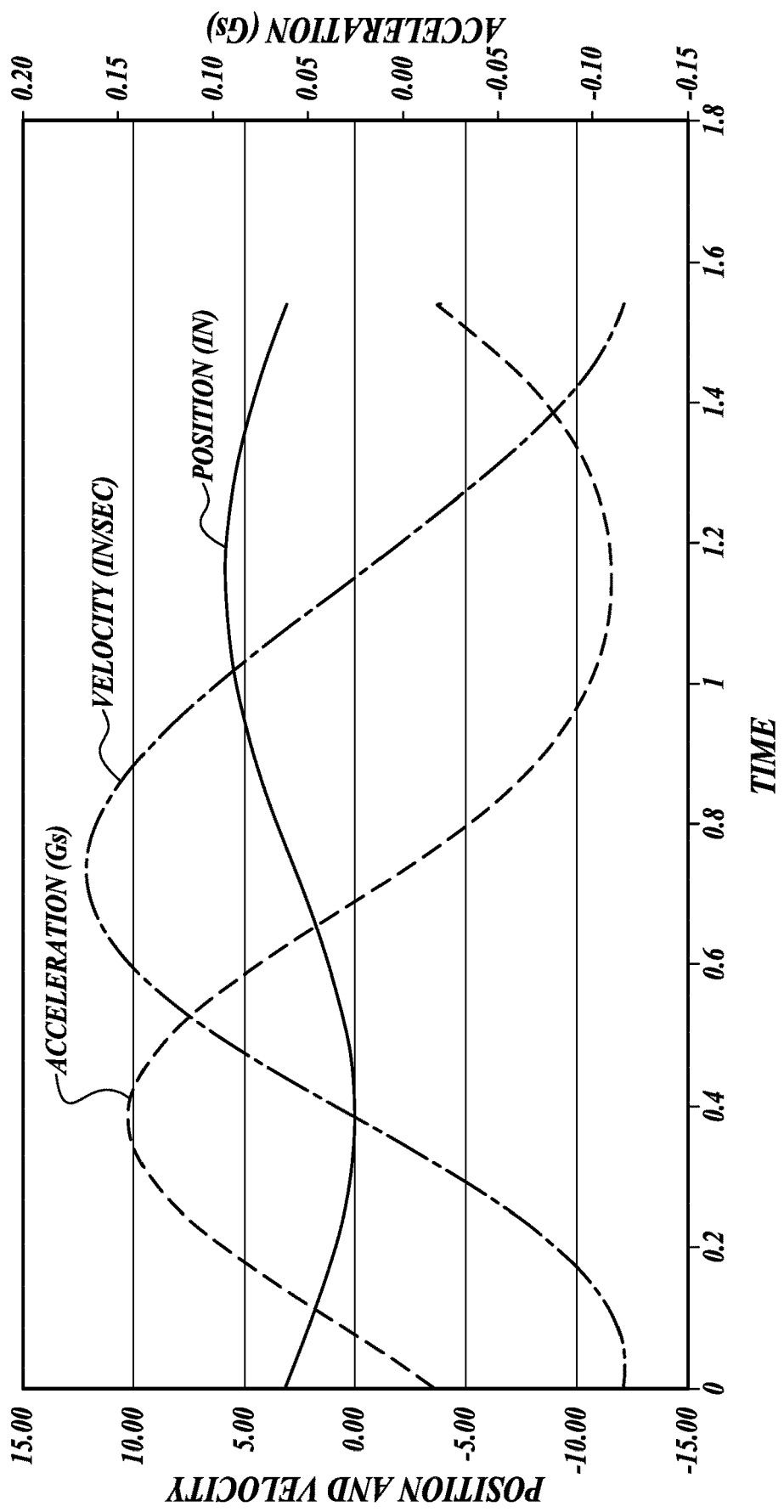
FIG. 16B is a graph showing a prior art position, velocity, and acceleration profile for a sinusoidal agitation pattern for thermal processing a load within a retort at a second rotation crank speed.
Figure 16C:
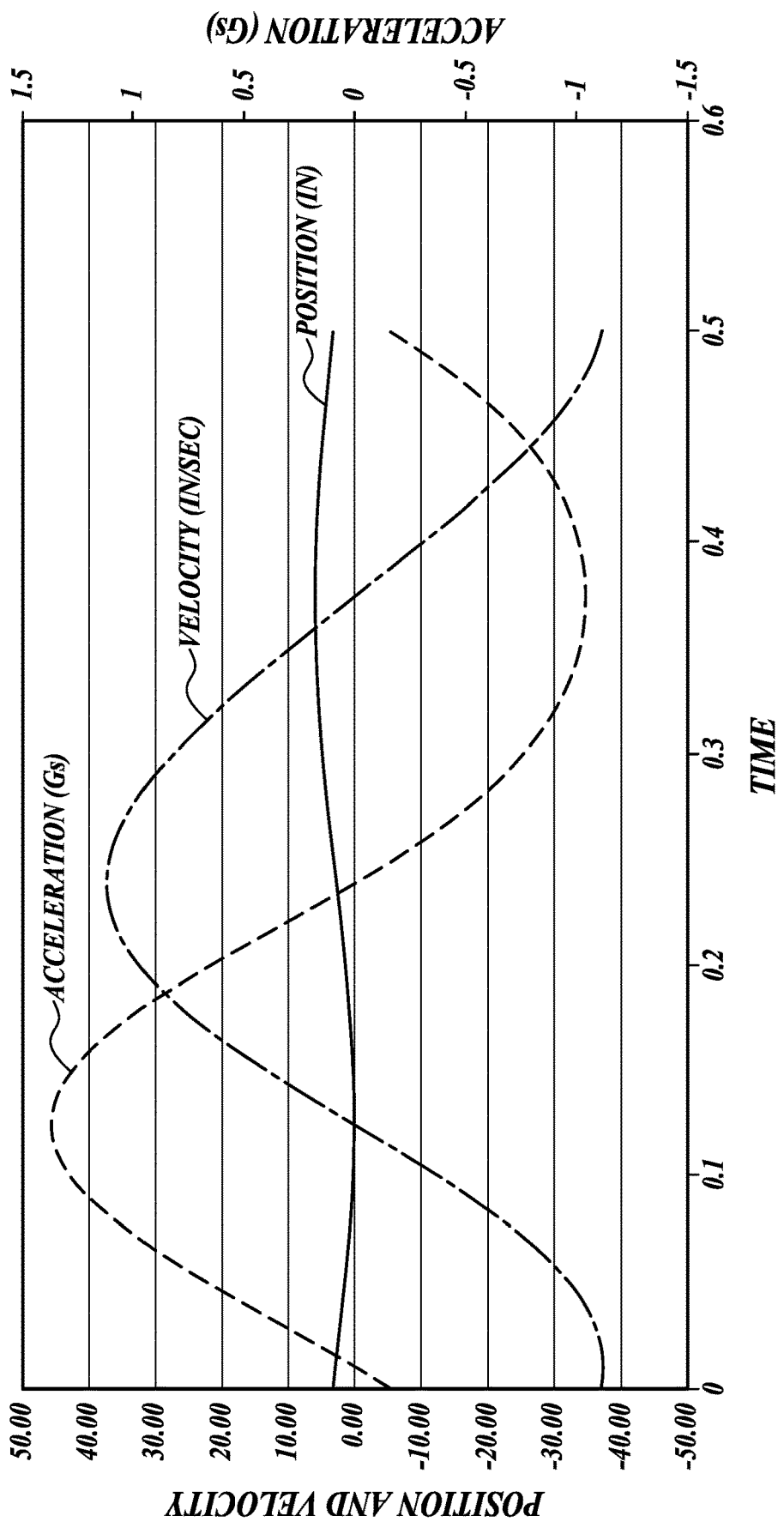
FIG. 16C is a graph showing a prior art position, velocity, and acceleration profile for a sinusoidal agitation pattern for thermal processing a load within a retort at a third rotation crank speed.
Figure 17:
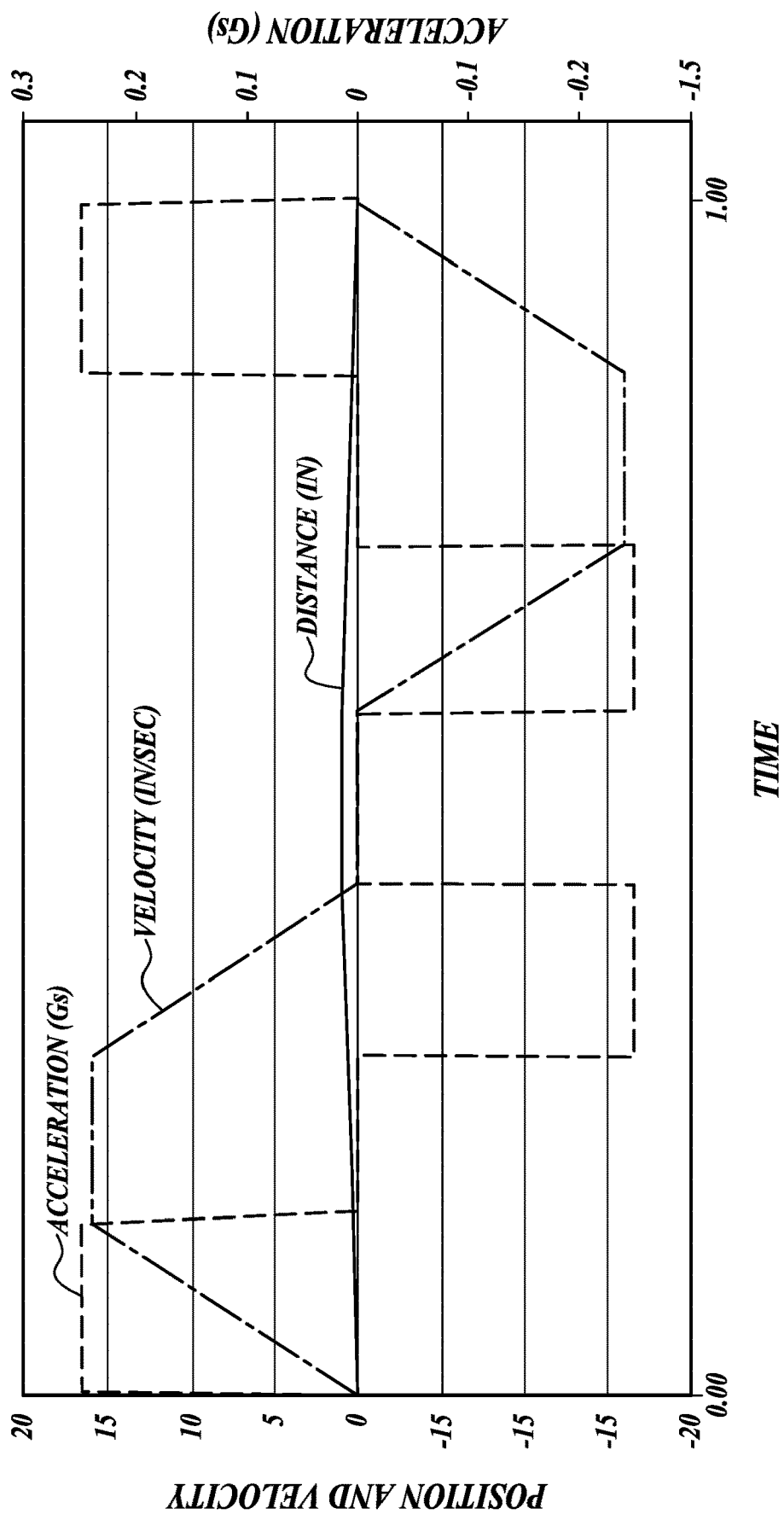
FIG. 17 is a graph showing a position, velocity, and acceleration profile for a non-sinusoidal agitation pattern for thermal processing a load within a retort

To help illustrate this point, FIGS. 16A-16C graphically depict exemplary first, second, and third position, velocity, and acceleration curves for a prior art crank shaft and flywheel system having a standard sinusoidal agitation motion, wherein the stroke length for each curve is substantially the same (about 6 inches). The first curve shown in FIG. 16A represents a position, velocity, and acceleration curve at a rotary crank speed of 30 RPMs, the second curve shown in FIG. 16B represents a position, velocity, and acceleration curve at a rotary crank speed of 40 RPMs, and the third curve shown in FIG. 16C represents a position, velocity, and acceleration curve at a rotary crank speed of 120 RPMs. As can be appreciated by a comparison of these curves, an acceleration of about 0.09 G's can be achieved at 30 RPMS (about 9.36 inches/second of linear movement), an acceleration of about 0.14 G's can be achieved at 40 RPMS (about 12.17 inches/second of linear movement), and an acceleration of about 1.37 G's can be achieved at 120 RPMS (about 37.45 inches/second of linear movement). To achieve a suitably high acceleration or G-force for agitation, a significantly high rotary crank speed (RPM) must be used. Moreover, the rotary crank speed would need to be increased at a significantly higher rate if a shorter stroke length was used.

By comparison, FIG. 17 graphically depicts an exemplary position, velocity, and acceleration curve for a non-sinusoidal agitation motion profile formed in accordance with embodiments of the present disclosure. An acceleration of about 0.25 G's can be achieved using only a stroke length of 1.0 inches. Moreover, by using a variable input drive mechanism 54, the stroke length and speed can be independently varied to impart a desired acceleration/G-force on the specific food product. For instance, the retort agitation system 20 can impart a varied stroke length during a thermal sterilization process, and it can increase the G-force output per stroke and decrease the strokes per minute experienced by the load. Prior art systems using crank shafts, on the other hand, have to increase the speed (cycles per minute) to increase the G-force imposed on the load.

Thus, by using a retort agitation system having a variable input drive mechanism, such as the retort agitation system 20 having the drive mechanism 54 described above, the motion profile of the food products in the carriers can be attuned to the changing properties of the food products while minimizing wear and tear on the reciprocating assembly 48. Moreover, the thermal processing time of the food products may be reduced while maintaining the same commercial sterility levels, the food product quality may be improved even with reduced thermal processing times, and the integrity of delicate/fragile food products can be maintained by varying the motion profile at certain times during the thermal process, among other benefits.

For instance, non-sinusoidal, customizable agitation motion profiles can reduce the thermal processing time by about 40-50% for some food products while maintaining the same sterilization Fo value. Of note, the in-container food product is held at a cook temperature until a specified Fo value is met, where the Fo value is a unit of lethality, i.e., how quickly a population of bacteria is destroyed. The faster the food product is heated, the faster the Fo value will accrue. Accordingly, if the food product is heated up faster during the initial heating phase, it is held at a higher temperature for an overall shorter amount of time to achieve the same Fo value for food safety. Thus, it can be appreciated that with a shorter initial heating phase of the food product (achievable with a non-sinusoidal, customizable agitation motion profile as described herein), the total time that the product experiences high thermal processing temperatures decreases, (initial heating phase+hold phase of food product). As a result, the quality of the contained food product increases.

The inventors performed preliminary testing to measure the improved thermal processing efficiencies using a retort agitation system in accordance with the present disclosure. The retort agitation system was configured to impose non-sinusoidal agitation motion profiles using a constant speed and stroke length throughout the entire thermal process with an imposed G-force of between about 0.75G-0.9 Gs. The following results were achieved for a paper board carton containing either minestrone soup or chicken soup with about a 9 mm headspace in the container, and with an Fo value of 6.

| | Cook Time (Minutes) | |
|---|---|---|
| Processing Mode | Minestrone Soup | Chicken Noodle Soup |
| Static | 27.6 | 20.8 |
| Non-Sinsoidal Agitation | 15.7 | 9.4 |

As can be appreciated, a retort using a non-sinusoidal agitation motion profile reduces the thermal processing time of both food products by about 45%-50% in comparison to a static retort.

The following results were achieved for a gallon pouch having a thickness of one and a half inches (1.5") and containing either pinto beans or mushrooms, with an Fo value of 7, and where the come-up phase was 16 minutes.

| | Cook Time (Minutes) | |
|---|---|---|
| Processing Mode | Pinto Beans | Mushrooms |
| Static | 31.6 | 22.8 |
| Rocking | 23.7 | 12.43 |
| Non-Sinsoidal Agitation | 19.1 | 10.8 |

As can be appreciated, a retort using a non-sinusoidal agitation motion profile reduces the thermal processing time of both food products by about 30%-50% in comparison to a static retort and by about 25%-45% in comparison to a retort using a rocking motion profile.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of processing products in a retort having a length, comprising:
   arranging products in at least one product carrier for movement along at least a portion of the length of the retort;
   activating a variable input linear drive mechanism to apply force linearly along the length of the retort to a reciprocating drive member extending linearly along a length of the retort and having a reciprocating drive axis in substantial coaxial alignment with a longitudinal axis of the retort, the reciprocating drive member interfacing with the at least one product carrier, the linear drive mechanism controllable with a controller to vary pause time between first and second directions along the length of the retort for more than an interruption in movement that occurs when the reciprocating drive member reverses direction, and speed, stroke length, frequency, acceleration, and deceleration of the reciprocating drive member;
   reciprocating the reciprocating drive member with the variable input linear drive mechanism to reciprocate the at least one product carrier along at least a portion of the length of the retort in a non-sinusoidal pattern of movement; and
   controlling the variable input linear drive mechanism with a controller to vary at least one of pause time between first and second directions along the length of the retort for more than an interruption in movement that occurs when the reciprocating drive member reverses direction, speed, stroke length, frequency, acceleration, and deceleration of the reciprocating drive member to define at least a portion of the non-sinusoidal pattern of movement of the at least one product carrier.

2. The method of claim 1, further comprising controlling the variable input linear drive mechanism with a controller to move the at least one product carrier in a first direction before moving the at least one product carrier back in an opposite second direction with a pause in movement of the at least one product carrier between the first and second directions, wherein a pause in movement is a stop in the movement of the at least one product carrier that is more than an interruption in movement that occurs when the at least one product carrier reverses direction.

3. The method of claim 1, further comprising controlling the variable input linear drive mechanism with a controller to move the at least one product carrier with a substantially constant acceleration over a first portion of the non-sinusoidal pattern of movement and moving the at least one product carrier with a substantially constant deceleration over a second portion of the non-sinusoidal pattern of movement.

4. The method of claim 1, further comprising controlling the variable input linear drive mechanism with a controller to move the at least one product carrier in a first direction with a first acceleration and moving the at least one product carrier in a second opposite direction with a second acceleration lower than the first acceleration.

5. The method of claim 1, further comprising controlling the variable input linear drive mechanism with a controller to move the at least one product carrier with a substantially constant acceleration over a first portion of a stroke and moving the at least one product carrier with a substantially constant deceleration over a second portion of the stroke, wherein a stroke is a movement of the at least one product carrier along at least a portion of the length of the retort.

6. The method of claim 5, further comprising controlling the variable input linear drive mechanism with a controller to pause the movement of the at least one product carrier between the first and second directions, wherein a pause in movement is a stop in the movement of the at least one product carrier that is more than an interruption in movement that occurs when the at least one carrier reverses direction.

7. The method of claim 1, further comprising controlling the variable input linear drive mechanism with a controller to vary a pause time between first and second directions along the length of the retort for more than an interruption in movement that occurs when the reciprocating drive member reverses direction to define at least a portion of the non-sinusoidal pattern of movement.

8. The method of claim 1, further comprising controlling the variable input linear drive mechanism with a controller to define at least a portion of the non-sinusoidal pattern of movement by at least one of a saw tooth profile, an s-curve profile, and a trapezoidal profile, wherein each profile may be graphically shown in terms of stroke position and time.

9. The method of claim 1, further comprising controlling the variable input linear drive mechanism with a controller to vary a stroke length and a speed for a plurality of cycles while keeping frequency constant for each of the plurality of cycles, wherein a cycle is movement of the at least one product carrier in a first direction from a start position along at least a portion of the length of retort and movement of the at least one product carrier in a second opposite direction back to the start position.

10. The method of claim 1, further comprising controlling the variable input linear drive mechanism with a controller to reciprocate the at least one product carrier a plurality of times, pausing any movement of the at least one product carrier, and reciprocating the at least one product carrier a plurality of times, wherein a pause in movement is a stop in the movement of the at least one product carrier that is more than an interruption in movement that occurs when the at least one product carrier reverses direction.

11. The method of claim 1, further comprising controlling the variable input linear drive mechanism with a controller to move the at least one product carrier along a portion of the length of retort from a first start position and reciprocating the at least one product carrier at least one time from a second start position defined along the length of the retort.

12. A method of processing food products in a retort using a thermal process having at least one of a come-up phase for increasing a temperature of a food product, a cook/hold phase for substantially maintaining a temperature of a food product, and a cool phase for decreasing a temperature of a food product, the method of processing products in a retort comprising:

arranging products in at least one product carrier for movement along at least a portion of a length of the retort;

executing, by a computing device, a first non-sinusoidal agitation profile of the at least one product carrier for at least one of the come-up, cook/hold, and cool phases of the thermal process and a second non-sinusoidal agitation profile for at least one of the other come-up, cook/hold, and cool phases of the thermal process that is different in at least one of stroke length, pause duration between strokes, frequency, and acceleration of strokes than the first non-sinusoidal agitation profile, wherein a stroke is a movement of the at least one product carrier along at least a portion of the length of the retort; and controlling, with a controller, a variable input linear drive mechanism configured to apply force linearly along the length of the retort to a reciprocating drive member extending linearly along a length of the retort and having a reciprocating drive axis in substantial coaxial alignment with a longitudinal axis of the retort and interfacing with the at least one product carrier to vary at least one of pause time between first and second directions along the length of the retort for more than an interruption in movement that occurs when the reciprocating drive member reverses direction, speed, stroke length, frequency, acceleration, and deceleration of the reciprocating drive member to execute the first and second non-sinusoidal agitation profiles of the at least one product carrier.

13. The method of claim 12, wherein the first non-sinusoidal agitation profile corresponds to the come-up phase of the thermal process and the second non-sinusoidal agitation profile corresponds to the cook/hold phase of the thermal process, and wherein the first non-sinusoidal agitation profile has a first stroke acceleration higher than a second stroke acceleration of the second non-sinusoidal agitation profile.

14. The method of claim 13, further comprising:
executing, by the computing device, a third non-sinusoidal agitation profile of the at least one product carrier for the cool phase of the thermal process, wherein the third non-sinusoidal agitation profile has a third stroke acceleration higher than the second stroke acceleration of the second non-sinusoidal agitation profile; and controlling, with a controller, the variable input linear drive mechanism to vary at least one of pause time between first and second directions along the length of the retort for more than an interruption in movement that occurs when the reciprocating drive member reverses direction, speed, stroke length, frequency, acceleration, and deceleration of the reciprocating drive member to execute the third non-sinusoidal agitation profile of the at least one product carrier.

15. The method of claim 12, wherein the first non-sinusoidal agitation profile corresponds to the come-up phase of a thermal process and the second non-sinusoidal agitation profile corresponds to the cook/hold phase of the thermal process, and wherein the first non-sinusoidal agitation profile has a first pause duration between strokes that is shorter than a second pause duration between strokes of the second non-sinusoidal agitation profile.

16. The method of claim 12, wherein the first non-sinusoidal agitation profile corresponds to the come-up phase of the thermal process and the second non-sinusoidal agitation profile corresponds to the cook/hold phase of the thermal process, and wherein the first non-sinusoidal agitation profile has a first stroke length shorter than a second stroke length of the second non-sinusoidal agitation profile.

17. The method of claim 12, further comprising:
executing, by the computing device, the first non-sinusoidal agitation profile for the come-up phase of the thermal process;
executing, by the computing device, the second non-sinusoidal agitation profile for the cook/hold phase of the thermal process; and
executing, by the computing device, one of the first and a third non-sinusoidal agitation for the cool phase of the thermal process.

18. The method of claim 17, wherein during the come-up phase the first non-sinusoidal agitation profile has at least one of:
a first stroke length for a first food product with a first viscosity and a second stroke length longer than the first stroke length for a second food product with a second viscosity lower than the first viscosity;
a first acceleration for the first food product and a second acceleration lower than the first acceleration for the second food product;
a first pause time between strokes for the first food product and a second pause time between strokes for the second food product that is shorter than the first pause time; and
a first agitation speed for a third food product having fluid with a first heating rate and particles with a second heating rate lower than the first heating rate, wherein the first agitation speed is higher than a second agitation speed of the second non-sinusoidal agitation profile for the cook/hold phase of the third food product.

19. The method of claim 17, wherein during the cool phase the third non-sinusoidal agitation profile has a third acceleration higher than a second acceleration of the second non-sinusoidal agitation profile for the cook/hold phase for a food product that increases in viscosity during at least one of the come-up and cook/hold phases.

20. A method of processing products in a retort having a length, comprising:
arranging products in at least one product carrier for movement along at least a portion of the length of the retort;
activating a variable input linear drive mechanism to apply force linearly along the length of the retort to a reciprocating drive member extending linearly along a length of the retort and having a reciprocating drive axis in substantial coaxial alignment with a longitudinal axis of the retort, the reciprocating drive member interfacing with the at least one product carrier, the variable input linear drive mechanism controllable with a controller to vary pause time between first and second directions along the length of the retort for more than an interruption in movement that occurs when the reciprocating drive member reverses direction, speed, stroke length, frequency, acceleration, deceleration of the reciprocating drive member to move the at least one product carrier in a non-sinusoidal pattern of movement;
sending, by a computing device, one or more signals to the variable input linear drive mechanism to apply force linearly along the length of the retort to the reciprocating drive member to execute a non-sinusoidal pattern of movement of the at least one product carrier by at least one of:
- a plurality of strokes of the at least one product carrier in a first direction before movement of the at least one product carrier back in an opposite second direction, wherein a stroke is a movement of the at least one product carrier by the drive mechanism along at least a portion of the length of the retort;
- a plurality of strokes of the at least one product carrier in a first direction before movement of the at least one product carrier back in an opposite second direction with a pause in movement between each of the plurality of strokes, wherein a pause in movement is a stop in the movement of the at least one product carrier that is more than an interruption in movement that occurs when the at least one carrier reverses direction;
- a first acceleration of the at least one product carrier in a first direction and a second acceleration of the at least one product carrier lower than the first acceleration in a second opposite direction;
- a substantially constant acceleration over a first portion of the non-sinusoidal pattern of movement and moving the at least one product carrier with a substantially constant deceleration over a second portion of the non-sinusoidal pattern of movement;
- a substantially constant acceleration over a first portion of a stroke and moving the at least one product carrier with a substantially constant deceleration over a second portion of the stroke;
- moving the at least one product carrier in a first direction before moving the at least one product carrier back in an opposite second direction with a pause in movement of the at least one product carrier between the first and second directions, wherein a pause in movement is a stop in the movement of the at least one product carrier that is more than an interruption in movement that occurs when the at least one carrier reverses direction;
- a first agitation motion profile for a first phase of a thermal process and a second agitation motion profile for a second phase of the thermal process; and
- varying a stroke length and a speed for a plurality of cycles while keeping frequency constant for each of the plurality of cycles, wherein a cycle is movement of the at least one product carrier in a first direction from a start position along at least a portion of the length of retort and movement of the at least one product carrier in a second opposite direction back to the start position.

* * * * *